US009775028B2

(12) United States Patent
Zhang et al.

(10) Patent No.: US 9,775,028 B2
(45) Date of Patent: Sep. 26, 2017

(54) METHOD AND RELATED DEVICE FOR GENERATING GROUP KEY

(71) Applicant: HUAWEI TECHNOLOGIES CO., LTD., Shenzhen (CN)

(72) Inventors: Lijia Zhang, Beijing (CN); Jing Chen, Shanghai (CN); Yixian Xu, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 117 days.

(21) Appl. No.: 14/264,587

(22) Filed: Apr. 29, 2014

(65) Prior Publication Data

US 2014/0233736 A1 Aug. 21, 2014

Related U.S. Application Data

(63) Continuation of application No. PCT/CN2012/083930, filed on Nov. 1, 2012.

(30) Foreign Application Priority Data

Nov. 1, 2011 (CN) .......................... 2011 1 0340029

(51) Int. Cl.
H04L 29/06 (2006.01)
H04W 12/04 (2009.01)
(Continued)

(52) U.S. Cl.
CPC ........... *H04W 12/04* (2013.01); *H04L 63/062* (2013.01); *H04L 63/065* (2013.01); *H04W 4/005* (2013.01); *H04W 4/08* (2013.01); *H04W 88/08* (2013.01)

(58) Field of Classification Search
CPC .................................................... H04L 63/065
See application file for complete search history.

(56) References Cited

U.S. PATENT DOCUMENTS

2004/0086124 A1* 5/2004 Sasaki .................. H04L 9/0833
380/277
2009/0254750 A1* 10/2009 Bono .................. H04L 63/0428
713/170
(Continued)

FOREIGN PATENT DOCUMENTS

CN 1758593 A 4/2006
CN 101511082 8/2009
(Continued)

OTHER PUBLICATIONS

Chinese Office Action issued on Nov. 25, 2014 in corresponding Chinese Patent Application No. 201110340029.0.
(Continued)

*Primary Examiner* — Jason K Gee
(74) *Attorney, Agent, or Firm* — Staas & Halsey LLP

(57) ABSTRACT

Embodiments of the present invention provide a method and a related device for generating a group key. The method includes: obtaining a group ID of a group where a machine type communication MTC device is located; obtaining a group communication root key corresponding to the group ID; generating a group key corresponding to the group ID according to the group communication root key; and sending the group key encrypted by using an access stratum key of the MTC device to the MTC device, so that the MTC device obtains the group key through decryption according to the access stratum key of the MTC device. According to the foregoing technical solutions, a base station may allocate, to an MTC device, a group key corresponding to a group where the MTC device is located.

10 Claims, 18 Drawing Sheets

(51) Int. Cl.
*H04W 4/00* (2009.01)
*H04W 4/08* (2009.01)
*H04W 88/08* (2009.01)

(56) References Cited

U.S. PATENT DOCUMENTS

| | | | | |
|---|---|---|---|---|
| 2009/0292914 A1* | 11/2009 | Liu | ................ | H04L 9/0836 |
| | | | | 380/279 |
| 2011/0038480 A1* | 2/2011 | Lin | ................ | H04W 12/04 |
| | | | | 380/270 |
| 2011/0261962 A1* | 10/2011 | Dupuis | ............ | H04L 9/0836 |
| | | | | 380/279 |

FOREIGN PATENT DOCUMENTS

| | | |
|---|---|---|
| CN | 102137397 | 7/2011 |
| EP | 2 549 785 A1 | 1/2013 |
| WO | 2011/131052 | 10/2011 |
| WO | WO 2011/127810 A1 | 10/2011 |
| WO | WO 2012/018130 A1 | 2/2012 |

OTHER PUBLICATIONS

Chinese Search Report issued on Nov. 13, 2014 in corresponding Chinese Patent Application No. 2011103400290.
International Search Report mailed Feb. 7, 2013 in corresponding International Application No. PCT/CN2012/083930.
PCT International Search Report and Written Opinion of the International Searching Authority dated Feb. 7, 2013 in corresponding International Patent Application No. PCT/CN2012/083930.
Extended European Search Report issued on Sep. 5, 2014 in corresponding European Patent Application No. 12846508.5.
European Office Action dated Jul. 12, 2016 in corresponding European Patent Application No. 12 846 508.5, 5 pages.
"Non-Access-Stratum (NAS) protocol for Evolved Packet System (EPS); 3GPP Standard TS 24.301", 3GPP, Dec. 21, 2010, XP050462346, 305 pages.

* cited by examiner

US 9,775,028 B2

METHOD AND RELATED DEVICE FOR GENERATING GROUP KEY

CROSS-REFERENCE TO RELATED APPLICATIONS

This application is a continuation of International Application No. PCT/CN2012/083930, filed on Nov. 1, 2012, which claims priority to Chinese Patent Application No. 201110340029.0, filed on Nov. 1, 2011, both of which are hereby incorporated by reference in their entireties.

TECHNICAL FIELD

The present invention relates to the field of communications, and in particular, to a method and a related device for generating a group key in the field of communications.

BACKGROUND

A machine to machine (M2M) technology is an integration of wireless communication and information technologies, and indicates that communication may be directly performed between a machine and another machine without manual intervention. M2M is rich in types of applications, including automatic instruments, remote monitoring, industrial security, ship automation, payment systems, vehicle remote control, and the like.

The M2M exists in three manners, including machine to machine, machine to mobile phone, and mobile phone to machine. In the M2M, an M2M device may access a network through a long distance connection technology and a short distance connection technology. The involved long distance connection technology includes wireless access type technologies such as a global system for mobile communications (GSM), a general packet radio service (GPRS), and a universal mobile telecommunications system (UMTS). The short distance connection technology includes 802.11b/g, blue tooth (Blue Tooth), Zigbee (Zigbee), a radio frequency identification (RFID) technology and an ultra wideband (UWB) technology. Definitely, other technologies that may be used to support M2M communication are included The M2M communication may also be referred to as machine type communication (MTC), and the M2M device may also be referred to as an MTC device.

In the prior art, a base station builds a common physical layer, a radio link control (RLC) layer, a packet data convergence protocol (PDCP) layer and a media access control (MAC) layer for a same group of MTC devices. After establishing a common bearer for the same group of MTC devices, each MTC device has its own separate key, keys of the MTC devices are different from each other, and a PDU unit interacting between the base station and an MTC device needs to carry an MTC device identifier to search for a corresponding key according to the identifier. Therefore, at the base station, it is required to maintain respective keys for MTC devices in the same group, which increases operation complexity of the base station, so that the number of keys that need to be maintained and managed by the base station is excessive, thereby affecting the performance of the base station.

SUMMARY

The present invention provides a method and a related device for generating a group key, so as to improve performance of a base station.

In one aspect, the present invention provides a method for generating a group key, including: obtaining a group ID of a group where a machine type communication MTC device is located; obtaining a group communication root key corresponding to the group ID; generating a group key corresponding to the group ID according to the group communication root key; and sending the group key encrypted by using an access stratum key of the MTC device to the MTC device, so that the MTC device obtains the group key through decryption according to the access stratum key of the MTC device.

In another aspect, the present invention provides a method for generating a group key, including: obtaining a group ID of a group where a machine type communication MTC device is located; obtaining a group communication root key corresponding to the group ID; and sending the group ID and the group communication root key to a base station, so that the base station generates a group key corresponding to the group ID according to the group communication root key and sends the group key encrypted by using an access stratum key of the MTC device to the MTC device.

In still another aspect, the present invention provides a method for generating a group key, including: receiving, from a base station, the group key encrypted by the base station by using an access stratum key of a machine type communication MTC device, where the group key is generated by the base station according to a group communication root key obtained by the base station, and is corresponding to a group ID of a group where the MTC device is located, where the group ID is obtained by the base station; or the group key is generated by the base station according to a group communication root key obtained from a mobility management entity MME, and is corresponding to a group ID of a group where the MTC device is located, where the group ID is obtained by the MME; and obtaining the group key through decryption according to the access stratum key of the MTC device.

In yet another aspect, the present invention provides a base station, including: a first obtaining module, configured to obtain a group ID of a group where a machine type communication MTC device is located; a second obtaining module, configured to obtain a group communication root key corresponding to the group ID; a generating module, configured to generate a group key corresponding to the group ID according to the group communication root key; and a first sending module, configured to send the group key encrypted by using an access stratum key of the MTC device to the MTC device, so that the MTC device obtains the group key through decryption according to the access stratum key of the MTC device.

In yet another aspect, the present invention provides a mobility management entity, including: a first obtaining module, configured to obtain a group ID of a group where a machine type communication MTC device is located; a second obtaining module, configured to obtain a group communication root key corresponding to the group ID; and a sending module, configured to send the group ID and the group communication root key to a base station, so that the base station generates a group key corresponding to the group ID according to the group communication root key and sends the group key encrypted by using an access stratum key of the MTC device to the MTC device.

In yet another aspect, the present invention provides a machine type communication device, including: a first receiving module, configured to receive, from a base station, a group key encrypted by the base station by using an access stratum key of the machine type communication MTC device, where the group key is generated by the base station according to a group communication root key obtained by the base station, and is corresponding to a group ID of a group where the MTC device is located, where the group ID is obtained by the base station; or the group key is generated by the base station according to a group communication root key obtained from a mobility management entity MME, and is corresponding to a group ID of a group where the MTC device is located, where the group ID is obtained by the MME; and a first decrypting module, configured to obtain the group key through decryption according to the access stratum key of the MTC device.

According to the foregoing technical solutions, a network side determines a group ID of a group where an MTC device is located, so as to determine a group key corresponding to the group ID, and by means of an access stratum key of the MTC device, a group key used by the MTC device may be securely allocated to the MTC device, so that MTC devices in a same group ID share a same group key. In this way, the MTC devices in the same group may use the same group key to perform group communication normally, and the base station only needs to maintain the same group key for the same group, thereby decreasing operation complexity of the base station, reducing the number of keys maintained and managed by the base station, and improving performance of the base station.

BRIEF DESCRIPTION OF DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Figure 1:
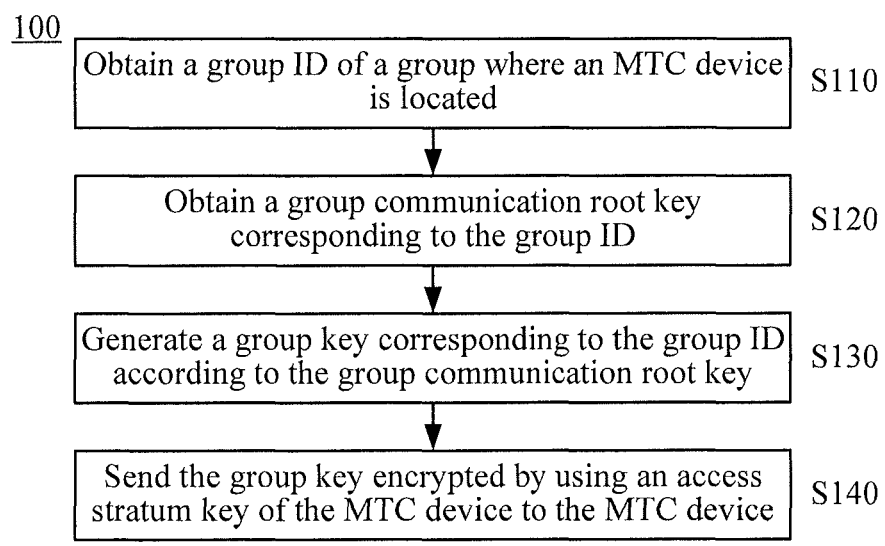
FIG. 1 is a flowchart of a method for generating a group key according to an embodiment of the present invention.

First, with reference to FIG. 1, a method 100 for generating a group key according to an embodiment of the present invention is described.

As shown in FIG. 1, the method 100 includes:

S110: obtain a group ID of a group where an MTC device is located.

S120: obtain a group communication root key corresponding to the group ID.

S130: generate a group key corresponding to the group ID according to the group communication root key.

S140: send the group key encrypted by using an access stratum key of the MTC device to the MTC device, so that the MTC device obtains the group key through decryption according to the access stratum key of the MTC device.

For example, the method 100 may be executed by a base station. By grouping the MTC device, the base station may further determine the group key corresponding to the group ID of the group where the MTC device is located, where the group key is corresponding to the group ID in a one-to-one manner, and each group ID is corresponding to a different group key. After determining the group key, the base station may send the group key to the MTC device through the access stratum key of the MTC device, thereby completing allocation of the group key, so that each MTC device in a group ID may securely obtain, through the access stratum key of the MTC device, the group key used in the group where the MTC device is located.

Therefore, by means of the allocation of the group key of a same group by the base station, MTC devices in the same group may use a same group key to perform group communication normally, and the base station only needs to maintain the same group key for the same group, thereby decreasing operation complexity of the base station, reducing the number of keys maintained and managed by the base station, and improving performance of the base station.

S110, the base station may obtain the group ID of the group where the MTC device is located in multiple manners. For example, the base station may group the MTC device, thereby grouping the MTC device into a group corresponding to the group ID. During the grouping, the base station may perform grouping according to a distance between the MTC device and the base station, may perform grouping according to signal strength of the MTC device, may perform grouping according to the manufacturer of the MTC device, or may perform grouping randomly. The present invention does not limit a specific manner of how to perform grouping.

For another example, the base station may obtain, from another network element, the group ID of the group where the MTC device is located. The another network element may be an MME, or an HSS (Home Subscriber System, home subscriber system), or another device of a core network or a device of a packet data network. The another network element may group the MTC device, and therefore the base station may obtain, from the another network element, he group ID of the group to which the MTC device belongs.

For another example, the base station may receive the group ID from the MTC device, thereby determining the group to which the MTC device belongs. For another example, the base station may receive, from the MTC device, a service ID of a service of the MTC device, and group the MTC device according to the service ID, thereby determining the group ID of the group to which the MTC device belongs. The manner of grouping according to a service ID to determine a group ID may be the same as that in the prior art, for example, grouping according to a position of an MTC device that supports a same service, and details are not repeatedly described herein.

According to an embodiment of the present invention, a base station may receive a group ID and a group communication root key from an MME, where the group communication root key is generated according to a random number and a set key corresponding to the group ID by a home subscriber system HSS to which one MTC device belongs, or the group communication root key is generated according to the random number, the group ID and an exclusive key of the one MTC device by the HSS when the HSS receives the group ID from an MTC device that is forwarded by the MME, and the HSS sends the group communication root key to the MME. According to another embodiment of the present invention, a base station may receive a service ID and a service root key corresponding to the service ID from an MME, where the service ID is a service ID of a service of an MTC device, which is sent by the MTC device to the MME, the service root key is generated, according to a random number and a set key corresponding to the service ID, by the HSS to which the MTC device belongs, or the service root key is generated according to the random number, the service ID and an exclusive key of one MTC device by the HSS when the HSS receives the service ID from the one MTC device that is forwarded by the MME, the HSS sends the service root key to the MME, and the base station determines, according to the service ID, the group ID of the group where the MTC device is located, and generates a group communication root key corresponding to the group ID according to the service root key.

In this way, the base station may flexibly obtain the group ID and the group communication root key in multiple manners in different embodiments. Because of the increasing number of network elements involved in a process of generating a group key and increasing security information such as the set key, security in generating the group key may be further improved, and that the base station generates a same group key for different groups is avoided. For corresponding examples, reference may be made to the description in the following first to fourth examples.

S120, the base station may obtain the group communication root key corresponding to the group ID in multiple manners. For example, the base station may select an MTC device from MTC devices in the group ID, and determine the group communication root key corresponding to the group ID according to a key of the selected MTC device. One group ID is at least corresponding to one MTC device, so the base station may select one MTC device therefrom, and use the key of the one MTC device as the group communication root key, or generate the group communication root key according to the key of the one MTC device. The key of the selected MTC device may be a KeNB corresponding to the MTC device.

For another example, the base station may receive the group communication root key corresponding to the group ID from the MME, where the MME groups the MTC device into the group corresponding to the group ID, selects the MTC device from the MTC devices in the group ID, and determines the group communication root key corresponding to the group ID according to a key of the selected MTC device, or the MME determines the group communication root key corresponding to the group ID according to a random number generated by the MME. The MME sends the generated group communication root key to the base station, so that the base station obtains the group communication root key corresponding to the group ID.

For another example, the base station may generate a random number, and determine the group communication root key corresponding to the group ID according to the random number. The base station may directly use the generated random number as the group communication root key corresponding to the group ID, or calculate to deduce the group communication root key corresponding to the group ID according to the random number.

For another example, after the base station receives a set ID and a first parameter from the MME, the base station may generate the group communication root key corresponding to the group ID according to the first parameter.

According to the embodiment of the present invention, after generating the group key in S130, the base station may bind and store the group communication root key, the group key, and the group ID. In this way, when it is determined that another MTC device belongs to the group corresponding to the group ID, the bound group key may be obtained according to the group ID; the group key encrypted by using an access stratum key of the another MTC device is sent to the another MTC device, so that the another MTC device obtains the group key through decryption according to the access stratum key of the another MTC device.

When determining that a group key needs to be generated for another MTC device belonging to the group ID, the base station does not need to determine the group communication root key and determine the group key according to the group communication root key; instead, the base station may allocate the group key to the MTC device directly according to the group key bound to the group ID, thereby decreasing processing complexity of the base station, improving efficiency in generating the group key, and ensuring that the MTC devices in the same group ID use the same group key.

The following describes an operation of the method 100 with reference to specific examples. In the following embodiments of the present invention which include a first example to a sixth example, a parameter with a word "Group" indicates a parameter related to a group, and a parameter "XXX_Group" of a group may have use and effect similar to those of a parameter "XXX" of one MTC device. For example, an AV_Group may have a generating manner and expression form similar to that of an authentication vector (Authentication Vector, AV), and a difference lies in that the AV_Group is for a group rather than for a specific MTC device.

A First Example

In the first example, a set ID is a group ID of a group where an MTC device is located, which means that the MTC device is grouped in advance, and the group where the MTC device is located is determined. The group ID may be preset in the MTC device, or may also be set in a USIM (Universal Subscriber Identity Module, universal subscriber identity module). When the USIM is inserted into the MTC device, the USIM becomes a part of the MTC device, thereby determining the group where the MTC device is located.

A first parameter is a group communication root key, that is, KeNB_Group in the following description, which is equal to a Kasme_Group generated by an HSS. The KeNB_Group has a function similar to that of the KeNB, and the difference lies in that the KeNB_Group is for a group, while the KeNB is for an MTC device. Other keys may be derived from the KeNB_Group.

Figure 2:
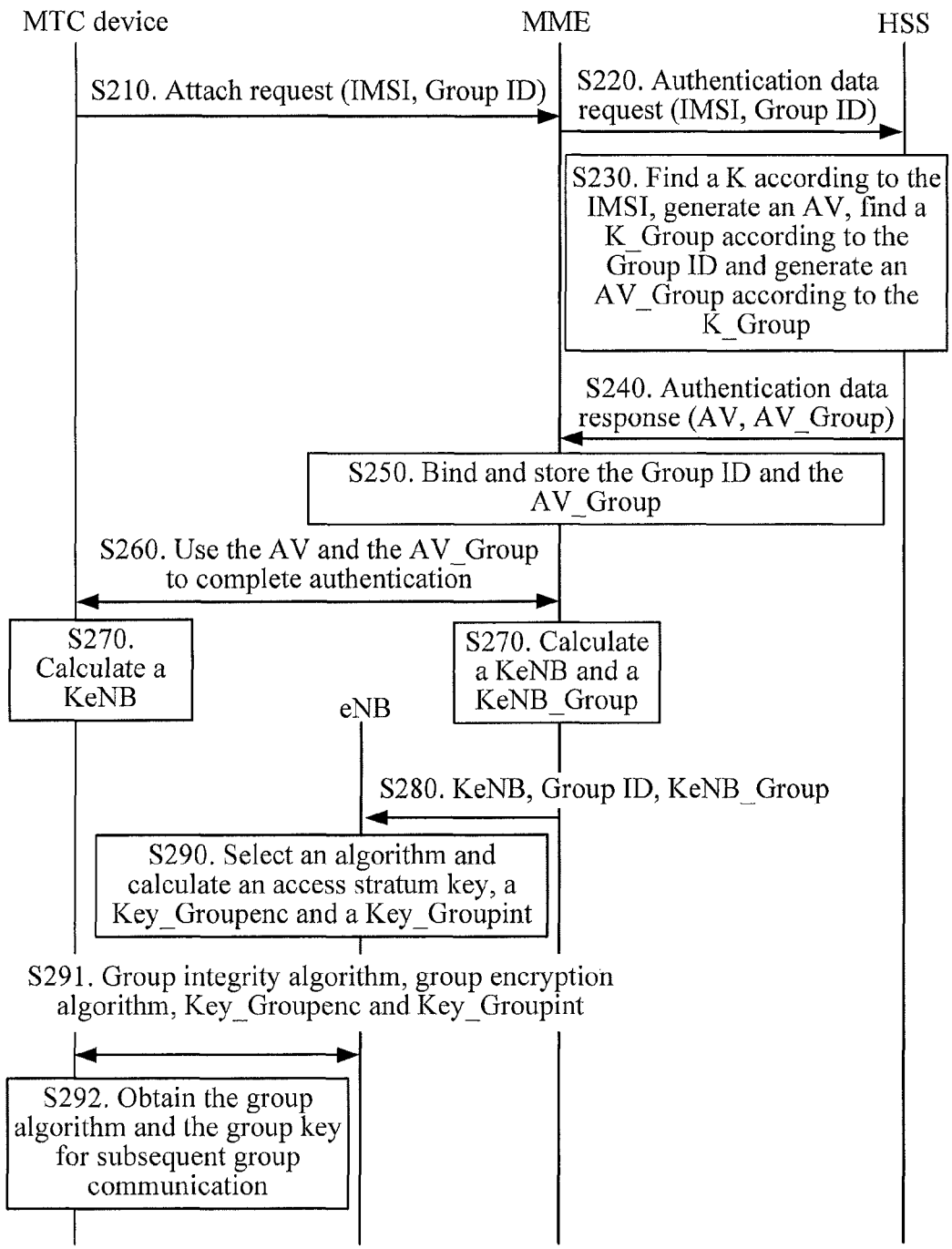
FIG. 2 is a flowchart of a first example of generating a group key by using a method according to an embodiment of the present invention.

In the first example shown in FIG. 2, a USIM inserted into the MTC device saves group information Group ID (group ID) of a group to which the MTC device belongs and a set key K_Group corresponding to the Group ID. Likewise, an HSS to which the MTC device belongs saves the K_Group corresponding to the Group ID.

S210, the MTC device sends an attach request to an MME, where the request includes an IMSI of the MTC device and a Group ID of the group to which the MTC device belongs.

After the MME receives the attach request sent by the MTC device, the MME determines whether to save an AV_Group bound to the Group ID.

When determining that no AV_Group bound to the Group ID is saved, before S260, the MME executes the following operations:

S220, the MME sends an authentication data request to the HSS, where the authentication data request includes an IMSI and a Group ID.

S230, the HSS finds a corresponding K according to the IMSI, and generates an AV according to the K, and the HSS finds a corresponding K_Group according to the Group ID, and generates an AV_Group according to the K_Group.

S240, the HSS sends the AV and the AV_Group to the MME through an authentication data response.

S250, the MME binds and stores the Group ID and the AV_Group.

Figure 3:
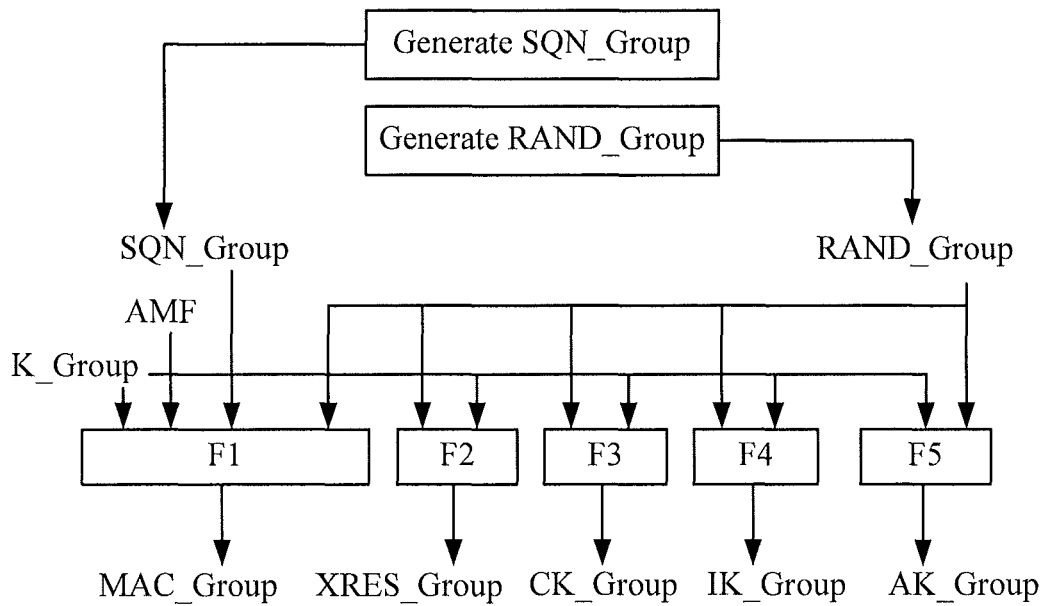
FIG. 3 is a schematic diagram of an example of generating a group authentication parameter in the first example.

A manner of generating an AV_Group according to a K_Group is shown in FIG. 3, and FIG. 3 herein is only an example but does not limit the manner of generating an AV_Group according to a K_Group.

In FIG. 3, an HSS generates an AV_Group for the Group ID with reference to a manner of generating an AV. An involved AMF and functions F1 to F5 have the same meanings as those in the prior art, and the difference lies in that other input parameters and generated parameters are for a group rather than for an MTC device.

The HSS generates a sequence number SQN_Group for the Group ID, and generates a random number RAND_Group for the Group ID. The K_Group, the SQN_Group, the RAND_Group and the AMF are input into each function shown in the figure, to generate a MAC_Group, an XRES_Group, a CK_Group, an IK_Group and an AK_Group. Then, an AUTN_Group and a Kasme_Group may be generated in the following manner:

$$AUTN\_Group=SQN \oplus AK\_Group \| AMF \| MAC\_Group$$

$$Kasme\_Group=KDF(SQN \oplus AK\_Group, SN\ ID, IK\_Group, CK\_Group)$$

where KDF is a key generating function, which may have a calculation manner same as that in the prior art, and is the same as the KDF function in the following, and the form of the KDF is not limited; represents XOR calculation; and ∥ represents that two physical quantities before and after the symbol are put together to form a continuous physical quantity.

After the AUTN_Group and the Kasme_Group are generated, the AV_Group may be obtained:

$$AV\_Group=RAND\_Group \| XRES\_Group \| Kasme\_Group \| AUTN\_Group$$

Return to FIG. 2, when determining that the AV_Group bound to the Group ID is saved, before S260, the MME executes the following operations:

S220, the MME sends an authentication data request to the HSS, and the request includes an IMSI.

S230, the HSS finds a corresponding K according to the IMSI, and generates an AV according to the K.

S240, the HSS sends the AV to the MME. In this case, S250 does not need to be executed.

Figure 4:
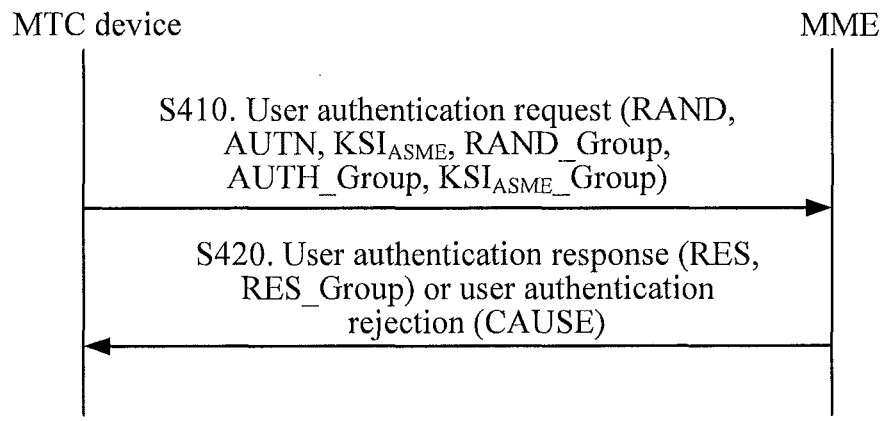
FIG. 4 is a flowchart of authentication performed by an MTC device and an MME (Mobility Management Entity, mobility management entity) in the first example.

Continue the procedure in FIG. 2. In S260, the MME and the MTC device use the AV and the AV_Group to perform authentication. The authentication process is shown in FIG. 4.

S410, the MME sends a user authentication request to the MTC device, where besides carrying RAND, AUTH, and $KSI_{ASME}$ as in the prior art to authenticate the MTC device, the request needs to further carry a RAND_Group, an AUTH_Group, and a $KSI_{ASME}$_Group in the manner of the embodiment of the present invention, to perform group authentication on whether the Group ID belongs to the group corresponding to the MTC device". The meaning and use of the RAND_Group, the AUTH_Group and the $KSI_{ASME}$_Group may be the same as those of the RAND, the AUTH and the $KSI_{ASME}$, except that the AND_Group, the AUTH_Group and the $KSI_{ASME}$_Group are parameters for a group, and the RAND, the AUTH and the $KSI_{ASME}$ are for an MTC device.

S420, when the authentication is successful, the MTC device returns a user authentication response to the MME, where besides carrying RES to respond to device authentication as in the prior art, the response also needs to carry an RES_Group in the manner of the embodiment of the present invention to respond to group authentication. In addition, if the authentication fails, the MTC device needs to send a user authentication rejection message to the MME as in the prior art, where the message carries a CAUSE parameter used to indicate a cause of the authentication failure.

Return to FIG. 2 and continue the procedure of FIG. 2. In S270, if the authentication is successful, the MME and the MTC device calculate the KeNB as in the prior art, and the MME may calculate the KeNB_Group according to the AV_Group, and in the embodiment, the Kasme_Group is used as the KeNB_Group. The KeNB_Group is a group communication root key of an access stratum, and other access stratum group keys may be generated through the KeNB_Group. Although in the first example shown in FIG. 2, the MTC device generates the KeNB concurrently with the MME in S270, the MTC device may also generate the KeNB at any moment after S260 and before S292.

S280, the MME sends the Group ID, the KeNB and the KeNB_Group to an eNB (evolved Node B, evolved base station).

S290, the eNB selects an integrity algorithm and an encryption algorithm according to a security capability of the MTC device. If the eNB establishes no binding related to the Group ID, the eNB selects, according to a group security capability of the MTC device, a group algorithm used to generate the group key, where the group algorithm may include a group integrity algorithm and a group encryption algorithm. A manner of selecting the group integrity algorithm and the group encryption algorithm may be similar to that of selecting the integrity algorithm and the encryption algorithm for the MTC device in the prior art. The group integrity algorithm and the group encryption algorithm may also be respectively similar to the integrity algorithm and the encryption algorithm in the prior art, and the difference lies in that the group integrity algorithm and the group encryption algorithm are algorithms for a group, while the integrity algorithm and the encryption algorithm are algorithms for an MTC device.

When the eNB generates a corresponding group key for a group ID to establish a binding relationship of the group ID for the first time, the eNB sets a key update count Key Count to 0, where the parameter may be used to derive and update the group key. When a PDCP count (PDCP Count) value reaches a maximum value, the Key Count value may be increased by 1. That the PDCP Count value reaches a maximum value may refer to that a hyper frame number (Hyper Frame Number, HFN) part in the PDCP Count reaches a maximum value, that is, when the HFN reaches a threshold, the Key Count is increased by 1. When the Key Count value is increased by 1, the eNB may update the group key, thereby avoiding reduction of security due to excessively long time of using the group key.

Then, the eNB may establish a binding relationship between the Group ID and the group integrity algorithm, the group encryption algorithm, and the Key Count, calculate an access stratum key of the MTC device and an access stratum group key of the group to which the MTC device belongs, and then also bind the access stratum group key and the KeNB_Group to the Group ID. A manner of calculating the access stratum key of the MTC device is the same as that in the prior art, and the access stratum group key may be calculated in the following manner.

In the specification, the access stratum group key may be briefly referred to as a group key. The access stratum group key may include a group encryption key Key_Groupenc and a group integrity key Key_Groupint. Key_Groupenc=KDF (KeNB_Group, Group-enc-alg, Alg-ID), and Key_Groupint=KDF (KeNB_Group, Group-int-alg, Alg-ID), where KDF is a key generating function, Group-enc-alg represents that a group encryption algorithm is used in the current calculation, Alg-ID is an algorithm identifier, and Group-int-alg represents that a group integrity algorithm is used in the current calculation.

If the eNB has established binding related to the Group ID, the eNB does not need to execute steps of selecting the group algorithm and calculating the group key.

Herein, although in the first example, the eNB selects the group integrity algorithm and the group encryption algorithm according to the group security capability of the MTC device, in other embodiments, the group integrity algorithm and the group encryption algorithm may also be pre-configured in the eNB. In this way, the eNB does not need to select a corresponding algorithm.

S291, the eNB sends, to the MTC device, a group algorithm including a group integrity algorithm and a group encryption algorithm and a group key including a group encryption key and a group integrity key, which are encrypted and integrity-protected by using the access stratum key of the MTC device, so that the MTC device performs group communication according to the group algorithm and the group key.

S292, the MTC device uses the access stratum key of the MTC device to obtain the group algorithm and the group key. In this way, the MTC device may use the group algorithm and the group key shared by a group to perform subsequent group communication normally.

If the Key Count is not equal to 0, the eNB may update the group key according to the Key Count. A manner of updating the group key may be first deriving a new KeNB_Group according to the Key Count, and then calculating a new group key by using the derived KeNB_Group.

For example, the following expression may be used to derive the new KeNB_Group. KeNB_Group* is used to indicate a derived KeNB_Group, and the KeNB_Group*obtained through derivation is used to replace the KeNB_Group and used as the current KeNB_Group:

$$KeNB\_Group^*=KDF(KeNB\_Group, Cell\ ID, Group\ ID)$$

where KDF is a key generating function, and Cell ID is a cell identifier. The number of the Key Count is the number of times of derivation.

The following expression may further be used to directly derive the KeNB_Group*, and the KeNB_Group* is used as the KeNB_Group:

$$KeNB\_Group^*=KDF(KeNB\_Group, Cell\ ID, Group\ ID, Key\ Count)$$

After the KeNB_Group is obtained through derivation, the eNB may use the KeNB_Group obtained through derivation to re-calculate the Key_Groupenc and the Key_Groupint. Then, the access stratum key of the MTC device is used to encrypt the group key obtained through re-calculation, and the encrypted group key is sent to the MTC device, so that the MTC device updates the group key, and uses the new group key to perform group communication.

In the first example, a group of MTC devices use one AV_Group in a period of time, the reuse of the AV_Group may be allowed, and a use rule of the SQN_Group may be that the SQN_Group in the AUTH_Group, which is received by the MTC device from a network side, is greater than or equal to the SQN_Group saved at a device side. If asynchronization occurs in the SQN_Group, the asynchronization may be solved by means of a resynchronization process.

In addition, if one MTC device in a group is originally in group communication, but exits the group communication after a period of time, when the MTC device needs to be switched from an idle (IDLE) state or a detach state to an active (ACTIVE) state to rejoin the group communication, the eNB sends the group key encrypted by using the access stratum key of the MTC device to the MTC device, so that the MTC device re-obtains the group key to perform group communication.

A Second Example

In the second example, a set ID is a group ID of a group where an MTC device is located. A first parameter is a group communication root key, that is, the KeNB_Group in the following description, which is equal to a Group Key generated by an HSS.

Figure 5:
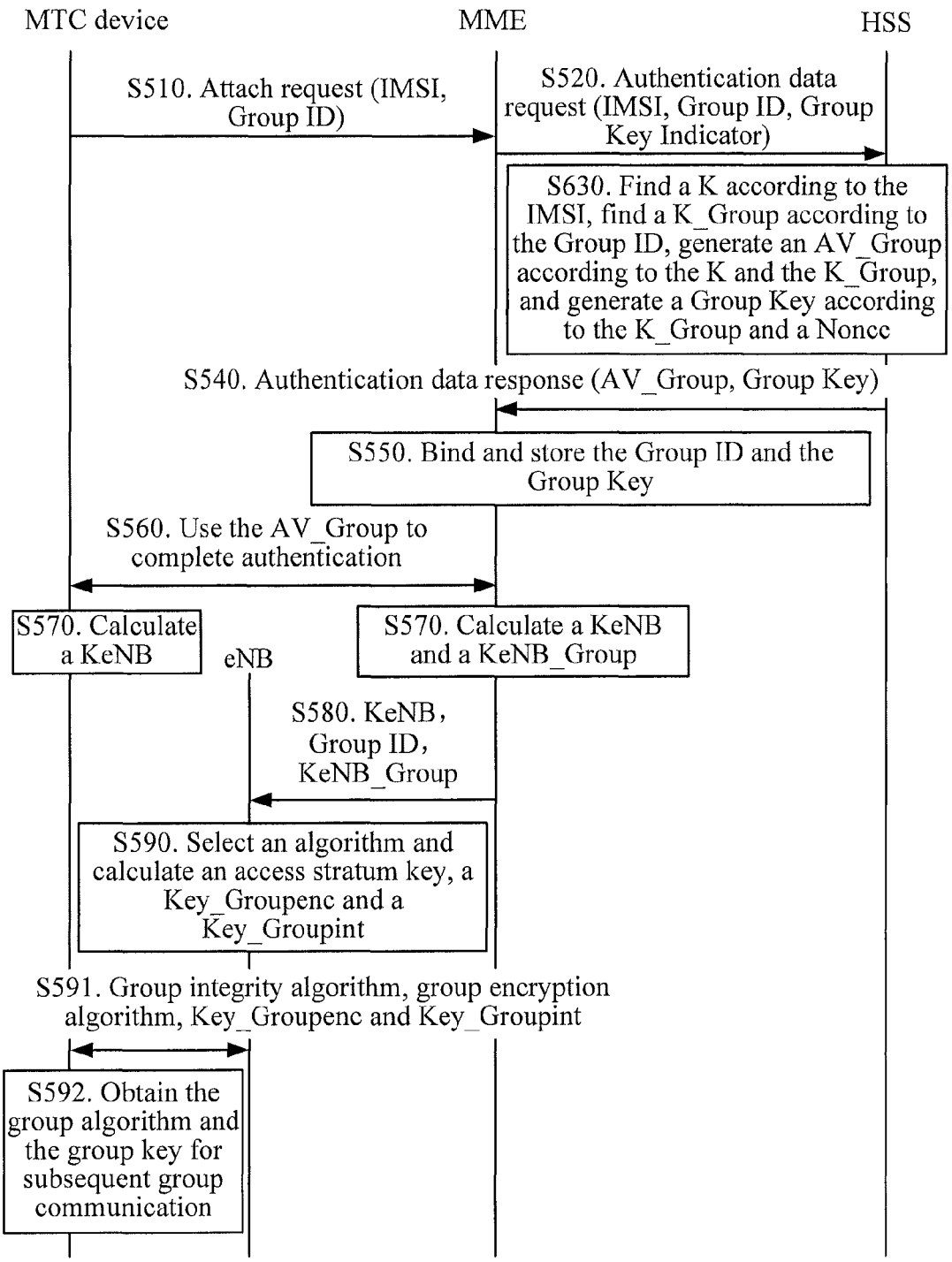
FIG. 5 is a flowchart of a second example of generating a group key by using a method according to an embodiment of the present invention.

In the second example shown in FIG. 5, a USIM of the MTC device saves a Group ID of a group to which the MTC device belongs and a key K_Group corresponding to the Group ID. Definitely, a person skilled in the art may also figure out that the Group ID and the K_Group corresponding to the Group ID may also be directly saved in the MTC device. In addition, the HSS to which the MTC device belongs also saves correspondence between the Group ID and the K_Group.

S510, the MTC device sends an attach request to an MME, where the request includes an IMSI of the MTC device and the Group ID.

After the MME receives the attach request sent by the MTC device, the MME determines whether a Group Key bound to the Group ID is saved.

When determining that no Group Key bound to the Group ID is saved, before S560, the MME executes the following operations:

S520, the MME sends an authentication data request message to an HSS, where the message includes an IMSI and a Group ID. When the AV_Group generated in S530 needs to be used in the subsequent authentication, the authentication data request needs to further include an indicator Group Key Indicator, used to indicate that the MME has not established related binding information of the Group ID, and the HSS needs to generate the Group Key. Definitely, if an AV in the prior art is used in the subsequent authentication, the Group Key Indicator may also be carried to indicate that no related binding information of the Group ID is established.

S530, the HSS finds a corresponding K according to the IMSI, and generates an AV according to the K, so that the MTC device and the network side use the AV to perform authentication. The K corresponding to the IMSI may be referred to as an exclusive key of the MTC device, and the value of any one K is unique and is only possessed by one MTC device. When the USIM is inserted into the MTC device, because the USIM saves the K, the MTC device is allocated a unique K.

The HSS may also find a corresponding K according to an IMSI, find a corresponding K_Group according to a Group ID, and generate an AV_Group by combining a K and a K_Group, so that the MTC device and the network side use the AV_Group to perform authentication. In addition, the HSS finds the corresponding K_Group according to the Group ID, and generates the Group Key according to the K_Group and a random number Nonce generated randomly.

S540, when the AV is used to perform authentication, the HSS sends the AV and the Group Key to the MME through an authentication data response message. When the AV_Group is used to perform authentication, the HSS sends the AV_Group and the Group Key to the MME through the authentication data response message.

S550, the MME binds and stores the Group ID and the Group Key.

Figure 6:
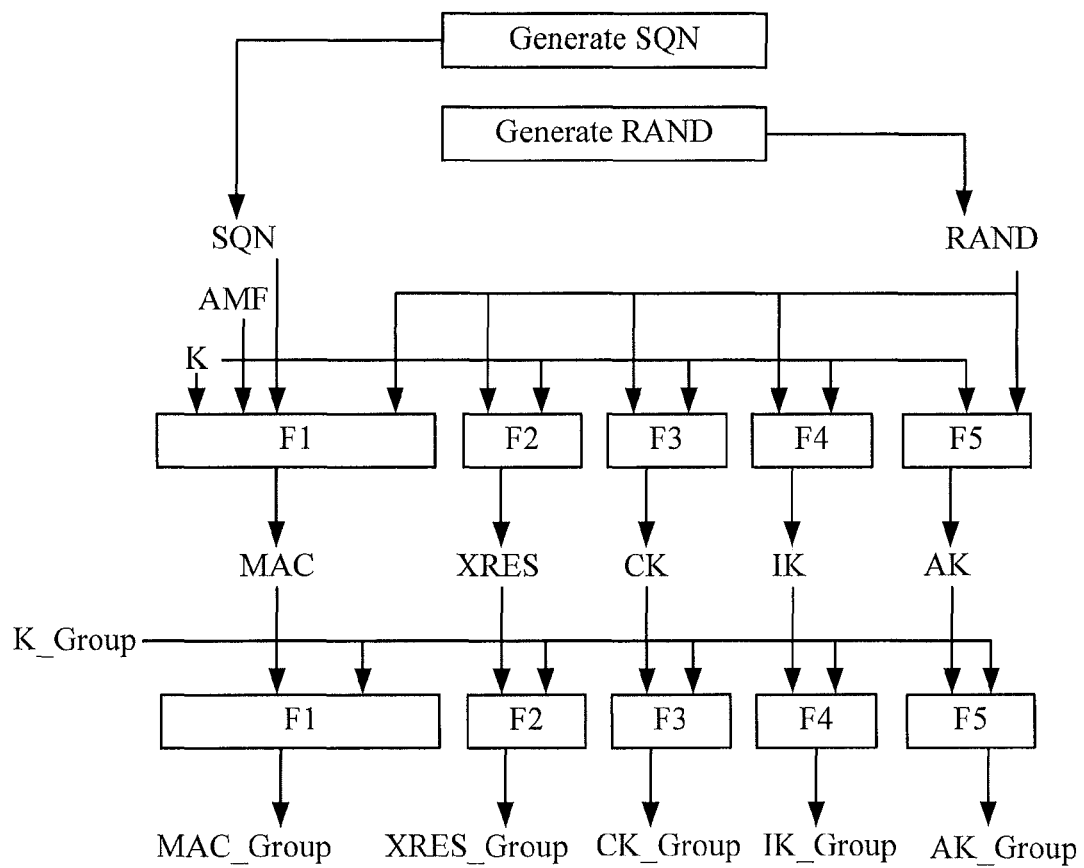
FIG. 6 is a schematic diagram of an example of generating a group authentication parameter in the second example.
Figure 7:
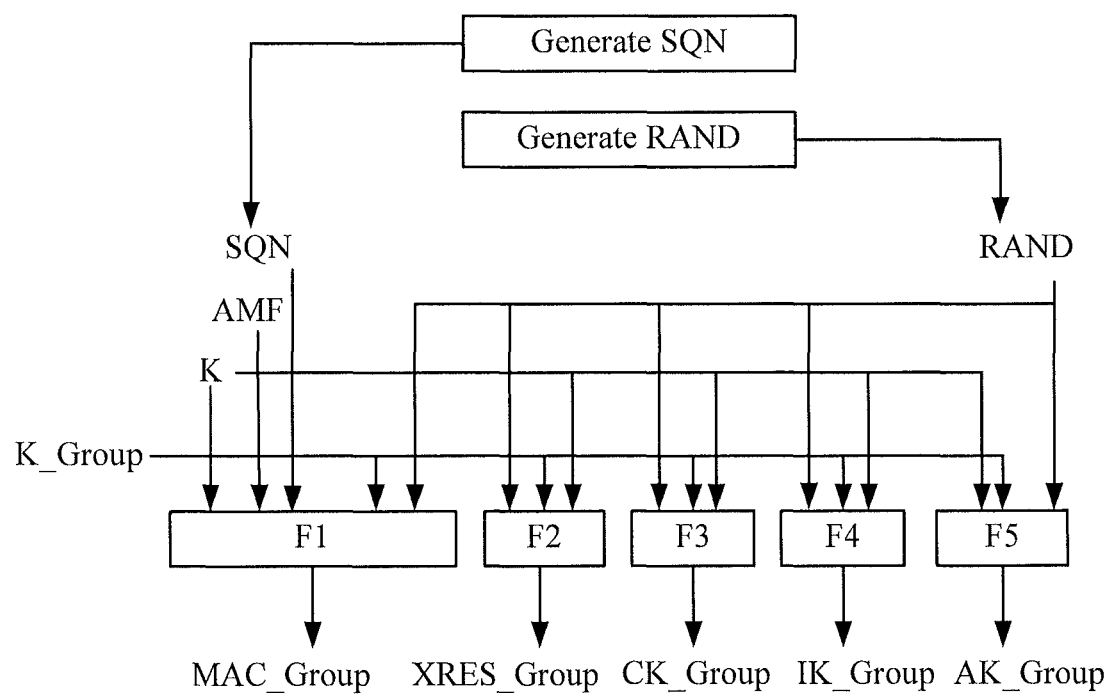
FIG. 7 is a schematic diagram of another example of generating a group authentication parameter in the second example.

A manner of generating the AV_Group according to the K and the K_Group may be shown in FIG. 6 and FIG. 7. Herein, FIG. 6 and FIG. 7 are only two examples but do not limit the manner of generating the AV_Group.

In FIG. 6, the HSS generates an SQN and generates an RAND, and uses the SQN and the RAND as a sequence number and a random number for a group. The HSS inputs, in the manner shown in the figure, the SQN, the RAND, the AMF and the K into functions F1 to F5 that are the same as those in the prior art, to obtain a MAC, an XRES, a CK, an IK and an AK. Then, the HSS inputs the K_Group, the MAC, the SRES, the CK, the IK and the AK into other functions F in the manner shown in the figure, where these functions F may be the same or different, and a specific form is not limited herein. Through these functions F, a MAC_Group, an XRES_Group, a CK_Group, an IK_Group and an AK_Group may be obtained respectively.

In FIG. 7, the HSS generates an SQN and generates an RAND, and uses the SQN and the RAND as a sequence number and a random number for a group. The HSS inputs, in the manner shown in the figure, the SQN, the RAND, the AMF, the K and the K_Group into functions F1 to F5 that are the same as those in the prior art, to obtain a MAC_Group, an XRES_Group, a CK_Group, an IK_Group and an AK_Group, respectively.

In FIG. 6 and FIG. 7, the AV_Group may be obtained in the following manner:

$$AUTN\_Group = SQN \oplus AK\_Group \| AMF \| MAC\_Group$$

$$Kasme\_Group = KDF(SQN \oplus AK\_Group, SN\ ID, IK\_Group, CK\_Group)$$

$$AV\_Group = RAND \| XRES\_Group \| Kasme\_Group \| AUTN\_Group$$

where KDF is a key generating function, which may have a same calculation manner as that in the prior art; $\oplus$ represents XOR calculation; and $\|$ represents that two physical quantities before and after the symbol are put together to form a continuous physical quantity.

When determining that the Group Key bound to the Group ID is saved, before S560, the MME executes the following operations:

S520, the MME sends an authentication data request message to the HSS, where when subsequently only the AV needs to be used to perform authentication, the authentication data request message includes an IMSI, and when subsequently the AV_Group needs to be used to perform authentication, the authentication data request message includes an IMSI and a Group ID.

S530, when the AV is used to perform authentication, the HSS finds the corresponding K according to the IMSI, and generates the AV according to the K. When the AV_Group is used to perform authentication, the HSS finds the corresponding K according to the IMSI, finds the corresponding K_Group according to the Group ID, and combines the K and the K_Group to generate the AV_Group.

S540, the HSS sends the AV or the AV_Group to the MME through an authentication data response. In this case, S550 does not need to be executed.

Figure 8:
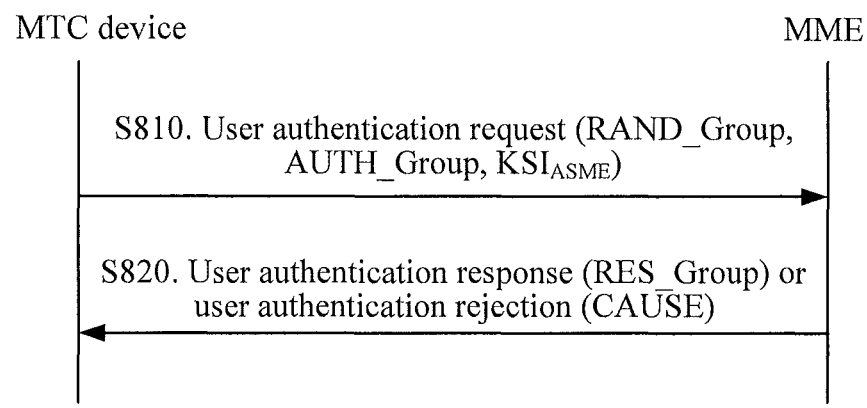
FIG. 8 is a flowchart of authentication performed by an MTC device and an MME in the second example.

Continue the procedure in FIG. 5. In S560, the MME and the MTC device use the AV or the AV_Group to perform authentication. When the AV is used to perform authentication, a manner same as that in the prior art is used. When the AV_Group is used to perform authentication, the authentication process is shown in FIG. 8.

S810, the MME sends a user authentication request to the MTC device, where the request carries the RAND_Group and the AUTN_Group in the AV_Group and the $KSI_{ASME}$ in the prior art.

S820, when the authentication is successful, the MTC device returns a user authentication response to the MME, where the response carries the RES_Group. In addition, if the authentication fails, the MTC device sends a user authentication rejection message to the MME, where the message carries a CAUSE parameter.

Return to FIG. 5 and continue the procedure of FIG. 5. In S570, if the authentication is successful, the MME and the MTC device calculate the KeNB as in the prior art, and the MME uses the Group Key as the KeNB_Group. Although in the second example shown in FIG. 5, the MTC device generates the KeNB concurrently with the MME in S570, the MTC device may also generate the KeNB at any moment after S560 and before S592.

S580, the MME sends the Group ID, the KeNB and the KeNB_Group to the eNB.

S590, the eNB selects an integrity algorithm and an encryption algorithm according to a security capability of the MTC device. If the eNB establishes no binding related to the Group ID, the eNB selects, according to a group security capability of the MTC device, a group algorithm used to generate the group key, where the group algorithm may include a group integrity algorithm and a group encryption algorithm, and calculates the access stratum key and the group keys Key_Groupenc and Key_Groupint. In addition, the eNB further binds the group algorithm, the Key Count, the KeNB_Group, the KeNB_Groupenc and the KeNB_Groupint to the Group ID. For related content of S590, reference may be made to the description in S290, and details are not repeatedly described herein to avoid repetition.

S591, the eNB sends, to the MTC device, a group algorithm including a group integrity algorithm and a group encryption algorithm and a group key including a group encryption key and a group integrity key, which are encrypted and integrity-protected by using the access stratum key of the MTC device, so that the MTC device performs group communication according to the group algorithm and the group key.

S592, the MTC device uses the access stratum key of the MTC device to obtain the group algorithm and the group key. In this way, the MTC device may use the group algorithm and the group key shared by a group to perform subsequent group communication normally.

In addition, if one MTC device in a group is originally in group communication, but exits the group communication after a period of time, when the MTC device needs to be switched from an IDLE state or a detach state to an ACTIVE state to rejoin the group communication, the eNB sends the group key encrypted by using the access stratum key of the MTC device to the MTC device, so that the MTC device re-obtains the group key to perform group communication.

A Third Example

In the third example, a set ID is a service ID (Service ID) of a service supported by an MTC device, which means that MTC devices are divided, according to functions or services of the MTC devices, into different service sets in advance, which are distinguished according to service IDs. However, a service set is not equal to a group sharing the same group key, and the group sharing the same group key needs further to be determined by performing grouping according to the service ID by a base station. The service ID may be preset in the MTC device; or may be set in a USIM. When the USIM is inserted into the MTC device, the USIM becomes a part of the MTC device, thereby determining the service supported by the MTC device.

A first parameter is a service root key corresponding to the service ID, that is, a KeNB_Service in the following description, which is equal to a Service Key generated by an HSS. By using the KeNB_Service, the base station may determine the KeNB_Group.

Figure 9:
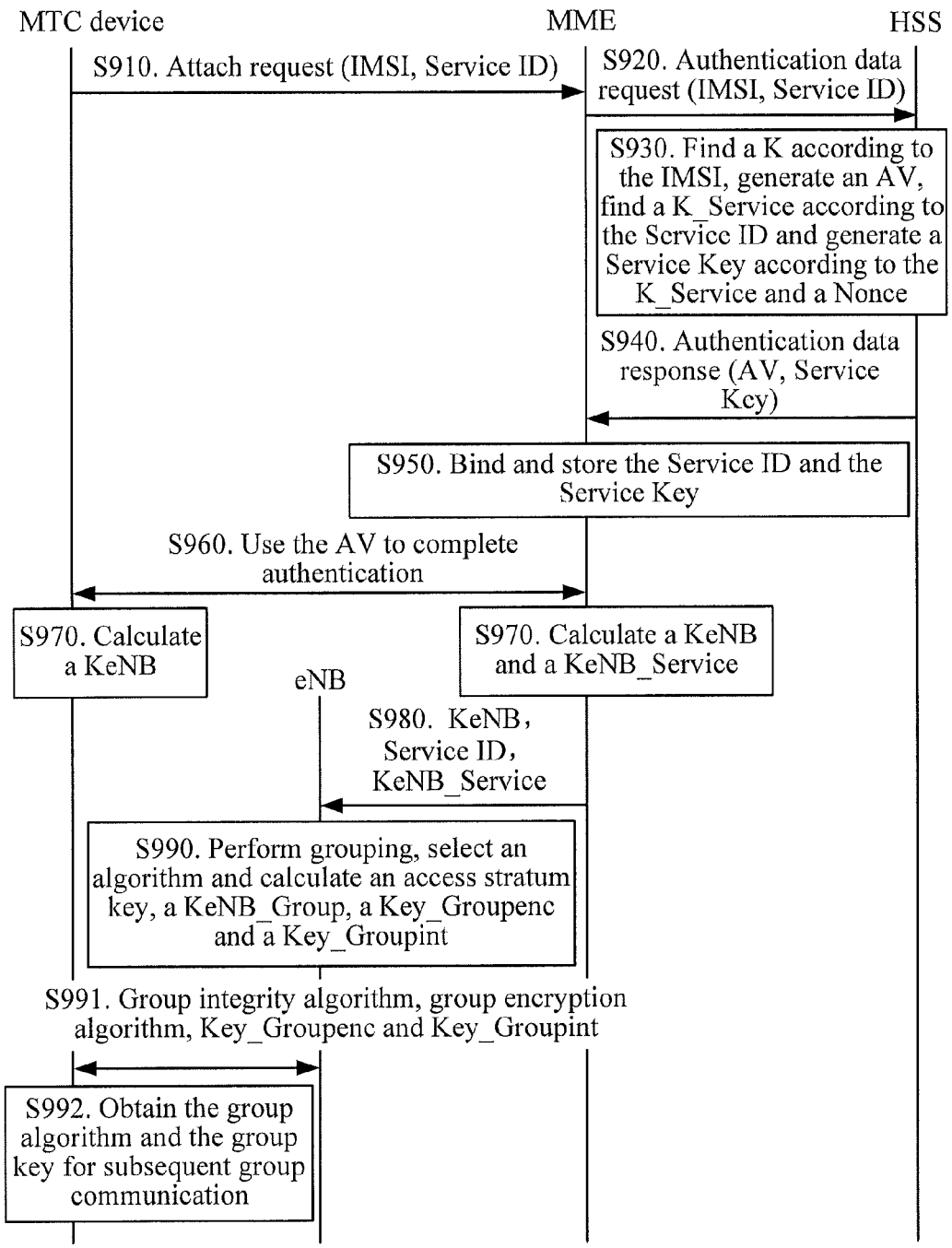
FIG. 9 is a flowchart of a third example of generating a group key by using a method according to an embodiment of the present invention.

In the third example shown in FIG. 9, a USIM of the MTC device saves a Service ID of a service of the MTC device and a key K_Service corresponding to the Service ID. Definitely, the Service ID and the key K_Service corresponding to the Service ID may also be saved in the MTC device. In addition, the HSS to which the MTC device belongs also saves correspondence between the Service ID and the K_Service.

S910, the MTC device sends an attach request to an MME, where the request includes an IMSI and a Service ID.

After the MME receives the attach request sent by the MTC device, the MME determines whether a Service Key bound to the Service ID is saved.

When determining that no Service Key bound to the Service ID is saved, before S960, the MME executes the following operations:

S920, the MME sends an authentication data request message to the HSS, where the message carries an IMSI and a Service ID.

S930, the HSS finds a corresponding K according to the IMSI, and generates an AV according to the K, so that the MME and the MTC device perform authentication by using the AV. The HSS finds the K_Service according to the Service ID, randomly generates a random number Nonce, and then generates the Service key according to the K_Service and the Nonce.

S940, the HSS sends the AV and the Service key to the MME through the authentication data response message.

S950, the MME binds and stores the Service ID and the Service Key.

When determining that the Service Key bound to the Service ID is saved, before S960, the MME executes the following operations:

S920, the MME sends an authentication data request message to the HSS, where the message carries an IMSI.

S930, the HSS finds a corresponding K according to the IMSI, and generates an AV according to the K.

S940, the HSS sends the AV to the MME through the authentication data response message. In this case, S950 does not need to be executed.

Continue the procedure in FIG. 9. In S960, the MME and the MTC device use the AV to perform authentication. A process of authentication by using the AV is the same as that in the prior art, and details are not repeatedly described herein.

S970, if the authentication is successful, the MME and the MTC device calculate the KeNB, and the MME uses the Service Key as the KeNB_Service. Although in the third example shown in FIG. 9, the MTC device generates the KeNB concurrently with the MME in S970, the MTC device may also generate the KeNB at any moment after S960 and before S992.

S980, the MME sends the Service ID, the KeNB and the KeNB_Service to the eNB.

S990, the eNB selects an integrity algorithm and an encryption algorithm according to a security capability of the MTC device. If the eNB establishes no binding relationship related to the Service ID, the eNB selects, according to a group security capability of the MTC device, a group algorithm used to generate the group key, where the group algorithm may include a group integrity algorithm and a group encryption algorithm, and calculates an access stratum key and an access stratum group key. A manner of selecting the group integrity algorithm and the group encryption algorithm may be similar to that of selecting the integrity algorithm and the encryption algorithm for the MTC device in the prior art. The group integrity algorithm and the group encryption algorithm may also be respectively similar to the integrity algorithm and the encryption algorithm in the prior art, and the difference lies in that the group integrity algorithm and the group encryption algorithm are algorithms for a group, while the integrity algorithm and the encryption algorithm are algorithms for an MTC device.

In a process of calculating the access stratum group key including the Key_Groupenc and the Key_Groupint, the eNB first needs to group, according to the Service ID, MTC devices supporting the same service, determine the KeNB_Group of a group according to the grouping, and then generate the group key according to the KeNB_Group and the group algorithm.

A manner of grouping the MTC devices belonging to the same service is varied, for example, performing grouping randomly, performing grouping according to signal strength of the MTC devices, and the like.

The following manner may be used to calculate the KeNB_Group:

$$KeNB\_Group=KDF(KeNB\_Service, Cell\ ID, Group\ ID)$$

where KDF is a key generating function, Cell ID is a serial number of a serving cell of an eNB, and Group ID is a group ID, obtained through grouping, of a group to which an MTC device belongs.

After the KeNB_Group is calculated, a group encryption key Key_Groupenc and a group integrity key Key_Groupint may be calculated:

$$Key\_Groupenc=KDF(KeNB\_Group, Group\text{-}enc\text{-}alg, Alg\text{-}ID)$$

$$Key\_Groupint=KDF(KeNB\_Group, Group\text{-}int\text{-}alg, Alg\text{-}ID)$$

where KDF is a key generating function, Group-enc-alg represents that a group encryption algorithm is used in the current calculation, Alg-ID is an algorithm identifier, and Group-int-alg represents that a group integrity algorithm is used in the current calculation.

After calculating the group key, the eNB further binds the group algorithm, the Key Count, the KeNB_Group, the KeNB_Groupenc and the KeNB_Groupint to the Group ID. In addition, as described in the first example, when the eNB generates a corresponding group key for a group ID to establish a binding relationship of the group ID for the first time, the eNB sets the Key Count to 0, and when a PDCP count value reaches a maximum value, increases the Key Count value by 1, and derives and updates the group key through the Key Count value.

In other embodiments, the group integrity algorithm and the group encryption algorithm may also be pre-configured in the eNB and the MTC device. In this case, S990, the group algorithm does not need to be selected, and the group algorithm does not need to be negotiated either.

S991, the eNB sends, to the MTC device, a group algorithm including a group integrity algorithm and a group encryption algorithm and a group key including a group encryption key and a group integrity key, which are encrypted and integrity-protected by using the access stratum key of the MTC device, so that the MTC device performs group communication according to the group algorithm and the group key.

S992, the MTC device uses the access stratum key of the MTC device to obtain the group algorithm and the group key. In this way, the MTC device may use the group algorithm and the group key shared by a group to perform subsequent group communication normally.

If the Key Count value is not equal to 0, the eNB may update the group key according to the Key Count, and a manner of updating the group key may be first deriving a new KeNB_Group according to the Key Count, and then using the derived KeNB_Group to calculate a new group key. For a deriving manner, reference may be made to related content in S292.

In addition, if one MTC device in a group is originally in group communication, but exits the group communication after a period of time, when the MTC device needs to be switched from an IDLE state or a detach state to an ACTIVE state to rejoin the group communication, the eNB sends the group key encrypted by using the access stratum key of the MTC device to the MTC device, so that the MTC device re-obtains the group key to perform group communication.

A Fourth Example

In the fourth example, a set ID is a service ID of a service supported by an MTC device. The service ID may be preset in the MTC device; or may be set in a USIM. When the USIM is inserted into the MTC device, the USIM becomes a part of the MTC device, thereby determining the service supported by the MTC device. A first parameter is a service root key corresponding to the service ID, that is, a KeNB_Service in the following description, which is equal to a Service Key generated by an HSS. By using the KeNB_Service, the base station may determine the KeNB_Group.

Figure 10:
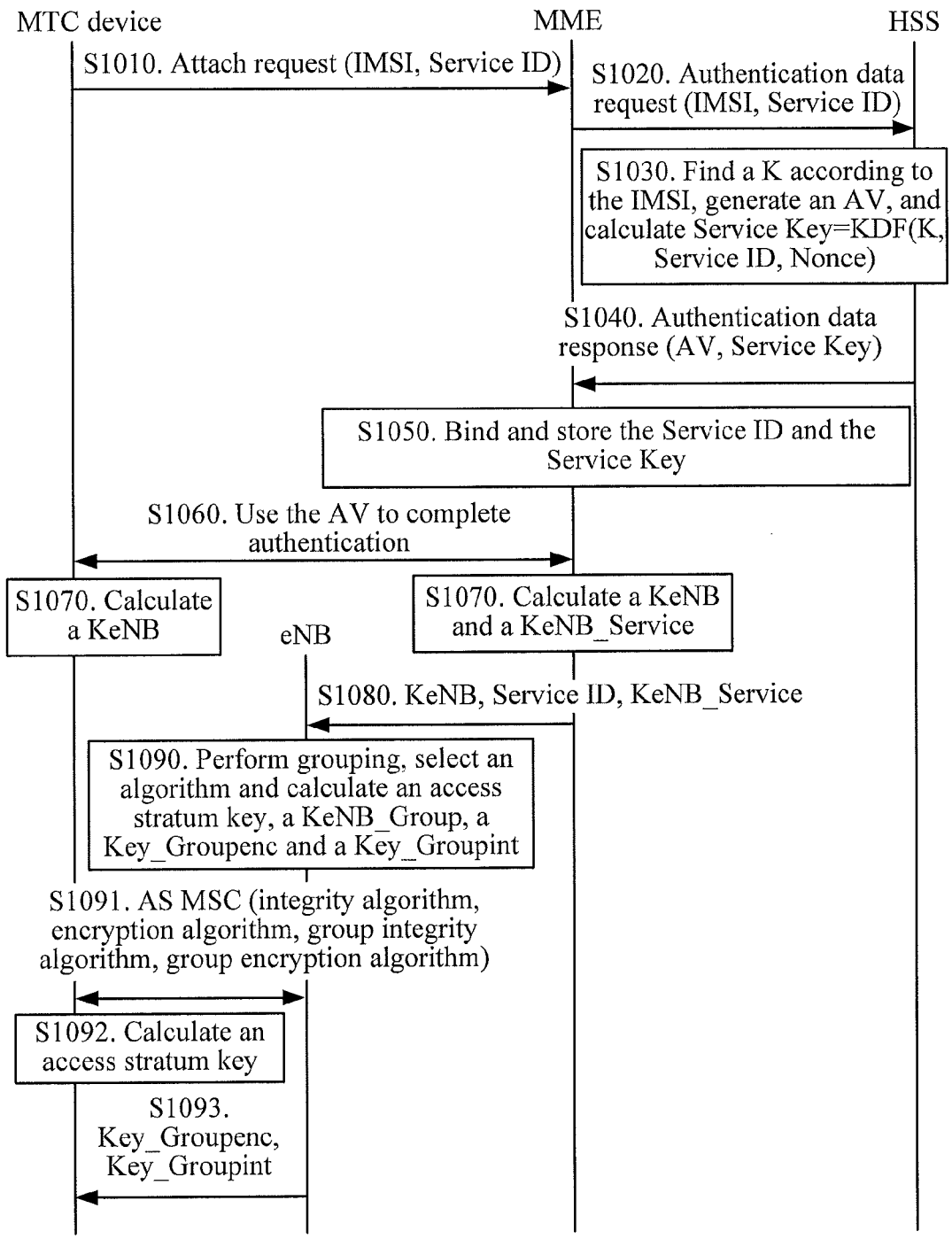
FIG. 10 is a flowchart of a fourth example of generating a group key by using a method according to an embodiment of the present invention.

In the fourth example shown in FIG. 10, a USIM of the MTC device saves a Service ID of a service of the MTC device and a key K_Service corresponding to the Service ID. Definitely, a person skilled in the art may also figure out that the Service ID and the K_Service corresponding to the Service ID may also be directly saved in the MTC device. In addition, the HSS to which the MTC device belongs also saves correspondence between the Service ID and the K_Service.

S1010, the MTC device sends an attach request to a network side, where the request includes an IMSI and a Service ID.

After the MME receives the attach request sent by the MTC device, the MME determines whether a Service Key bound to the Service ID is saved.

When determining that no Service Key bound to the Service ID is saved, before S1060, the MME executes the following operations:

S1020, the MME sends an authentication data request message to the HSS, where the message carries an IMSI and a Service ID.

S1030, the HSS finds a corresponding K according to the IMSI, and generates an AV according to the K, so that the MME and the MTC device perform authentication by using the AV. Moreover, the HSS calculates the Service Key according to the Service ID, where Service Key=f (K, Service ID, Nonce), where Nonce is a random number generated by the HSS, and f is a function required for generating the Service Key. The present invention does not limit a specific form of the function. In addition, in other embodiments, the Service Key may also be calculated by the HSS or the MME according to the Kasme, for example, Service Key=f (Kasme, Service ID, Nonce)

S1040, the HSS sends the calculated AV and Service Key to the MME.

S1050, the MME establishes a binding relationship between the Service ID and the Service Key and stores the binding relationship.

When determining that the Service Key bound to the Service ID is saved, before S1060, the MME executes the following operations:

S1020, the MME sends an authentication data request message to the HSS, where the message carries an IMSI.

S1030, the HSS finds a corresponding K according to the IMSI, and generates an AV according to the K.

S1040, the HSS sends the AV to the MME through the authentication data response message. In this case, S1050 does not need to be executed.

Continue the procedure in FIG. 10. 1060, the MME and the MTC device use the AV to perform authentication. A process of authentication by using the AV is the same as that in the prior art, and details are not repeatedly described herein.

S1070, if the authentication is successful, the MME and the MTC device calculate the KeNB, and the MME uses the Service Key as the KeNB_Service. Although in the fourth example shown in FIG. 10, the MTC device generates the KeNB concurrently with the MME in S1070, the MTC device may also generate the KeNB at any moment after S1060 and before S1092.

S1080, the MME sends the Service ID, the KeNB and the KeNB_Service to the eNB.

S1090, the eNB selects an integrity algorithm and an encryption algorithm according to a security capability of the MTC device. If the eNB establishes no binding relationship related to the Service ID, the eNB selects, according to a group security capability of the MTC device, a group algorithm used to generate the group key, where the group algorithm may include a group integrity algorithm and a group encryption algorithm, and calculates an access stratum key and an access stratum group key. In a process of calculating the access stratum group key including the Key_Groupenc and the Key_Groupint, the eNB first needs to group, according to the Service ID, MTC devices belonging to the same service, determine the KeNB_Group of a group according to the grouping, and then generate the group key according to the KeNB_Group and the group algorithm. After calculating the group key, the eNB further binds the group algorithm, the Key Count, the KeNB_Group, the KeNB_Groupenc and the KeNB_Groupint to the Group ID. In other embodiments, the group integrity algorithm and the group encryption algorithm may also be pre-configured in the eNB and the MTC device. For related content of S1090, reference may be made to the description in S990.

S1091, the eNB and the MTC device execute an AS SMC (Access Stratum Security Mode Command, access stratum security mode command), and negotiate an integrity algorithm, an encryption algorithm, a group integrity algorithm, and a group encryption algorithm that are selected.

S1092, the MTC device calculates an access stratum key according to the negotiated algorithms.

S1093, the eNB sends the calculated Key_Groupenc and Key_Groupint to the MTC device after access stratum security protection, and then the MTC device and the network side may use the Key_Groupenc and the Key_Groupint to perform group communication.

In the third example and the fourth example, the MTC device may also be grouped in the MME according to the Service ID, and then the MME sends the Group ID obtained through grouping to the eNB; and the MTC device may further be grouped on a specific entity with an M2M function. The entity notifies the eNB of the Group ID obtained through grouping. In this way, in S990 and S1090, the eNB does not need to perform grouping anymore, but may directly calculate the KeNB_Group according to the received Group ID.

In the third example and the fourth example, the network side may obtain the service ID of the MTC device in multiple manners, for example: the MTC device sends the Service ID to the network side, as described in the foregoing; the HSS saves a binding relationship between the IMSI and the Service ID, and may find the corresponding Service ID through the IMSI; the specific entity with an M2M function saves the binding relationship between the IMSI and the Service ID, and the HSS may obtain the corresponding Service ID from the entity; and the HSS learns the Service ID through a specific field of the IMSI.

Figure 11:
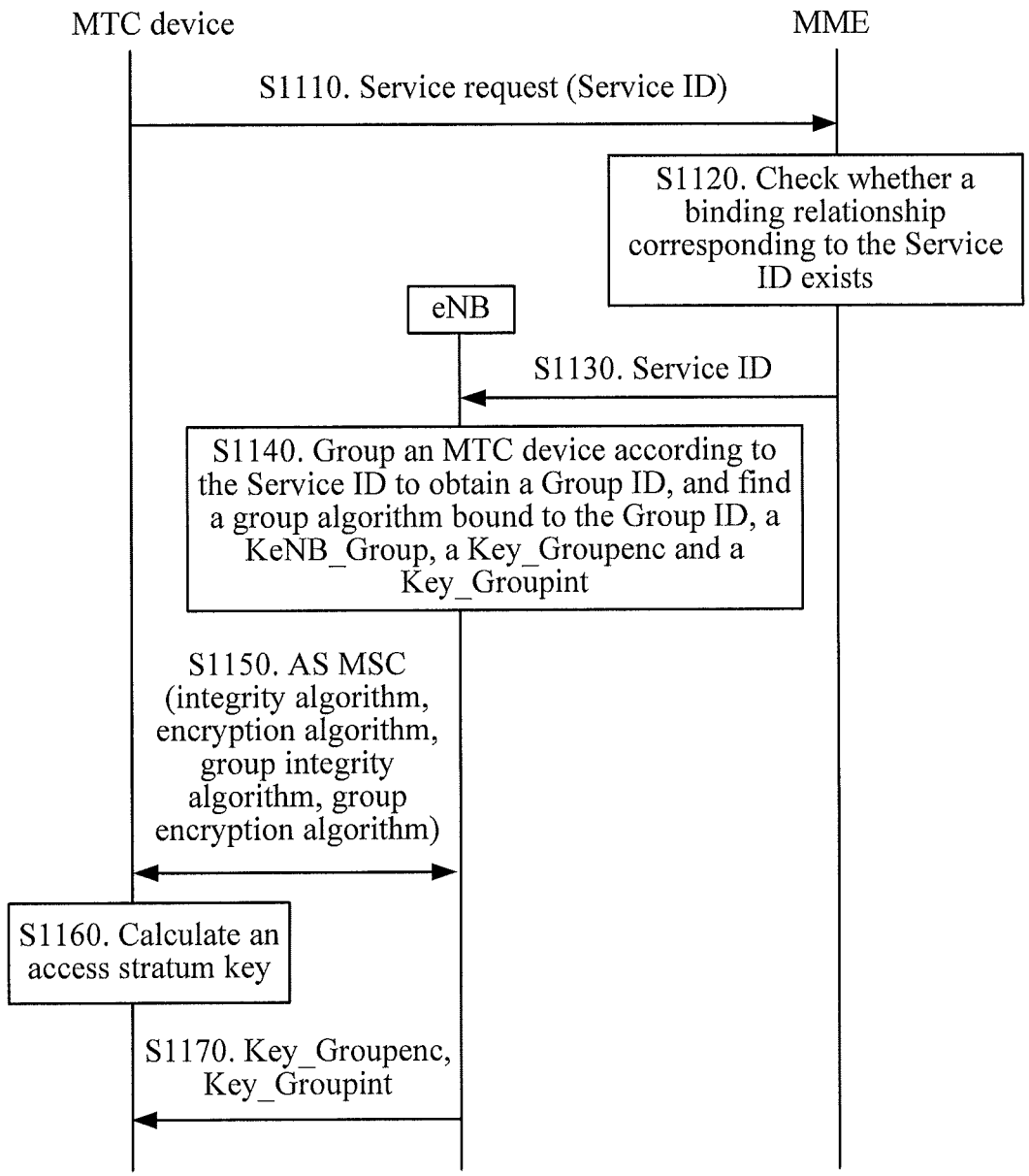
FIG. 11 is a flowchart of rejoining a group communication by an MTC device in an idle state or a detach state in the third example and the fourth example.

In addition, in the third example and the fourth example, when the MTC device is switched from an IDLE state to an ACTIVE state, group key synchronization may be performed through the flowchart shown in FIG. 11.

S1110, the MTC device sends a service request message to a network side, where the message includes the Service ID.

S1120, the MME checks whether a binding relationship corresponding to the Service ID exists, and if not, executes S1020 to S1050 executed when the MME has no binding relationship in FIG. 10 and subsequent S1060 to S1093; and if yes, sends the Service ID to the eNB.

S1130, the MME sends the Service ID to the eNB.

S1140, the eNB groups the MTC device to obtain the Group ID according to the Service ID, and searches for a group algorithm and a group key bound to the Group ID.

S1150, the eNB sends an AS SMC to the MTC device, and negotiates an integrity algorithm, an encryption algorithm, a group integrity algorithm and a group encryption algorithm.

S1160, the MTC device calculates an access stratum key, the Key_Groupenc, and the Key_Groupint according to the negotiated algorithms.

A Fifth Example

Figure 12:
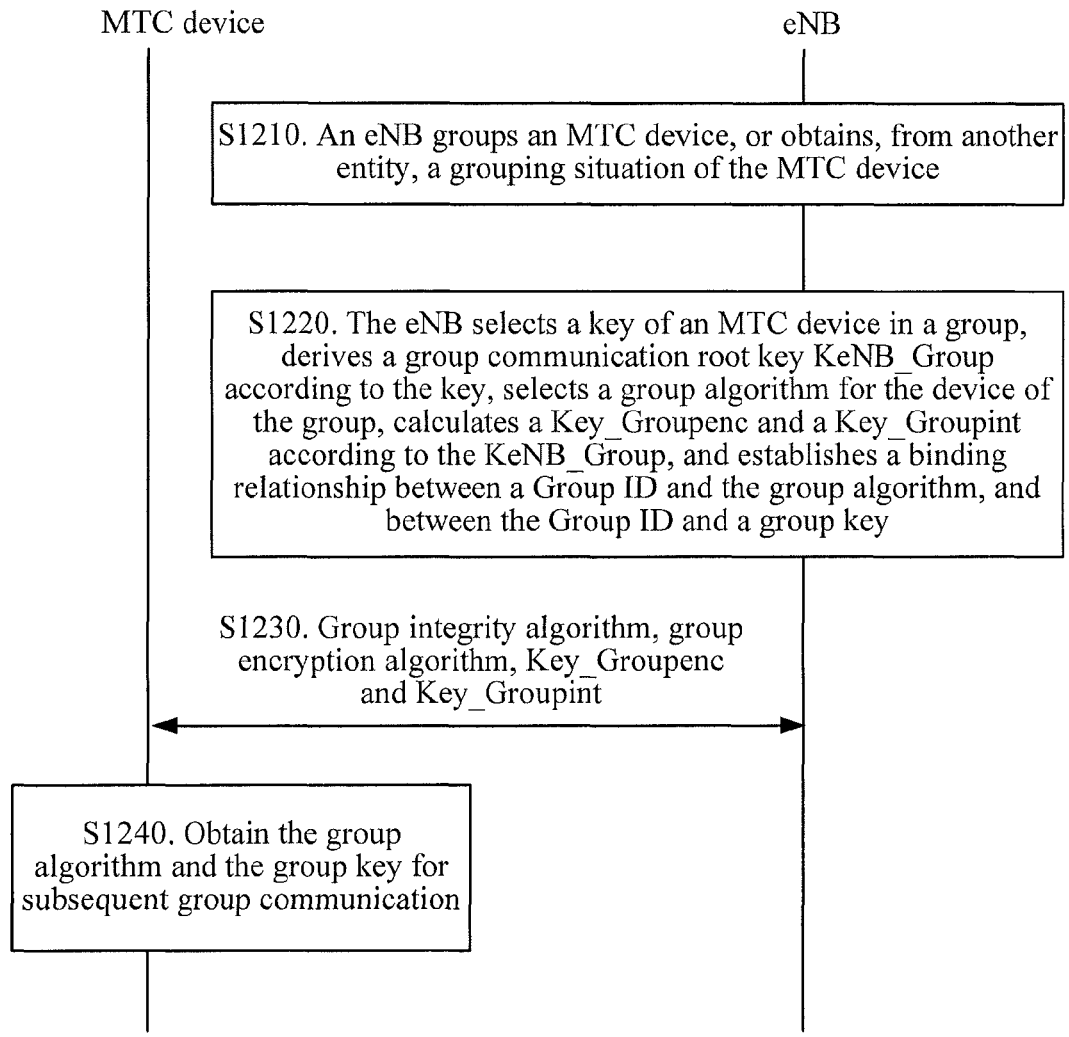
FIG. 12 is a flowchart of a fifth example of generating a group key by using a method according to an embodiment of the present invention.

FIG. 12 is a flowchart of a fifth example of generating a group key by using a method according to an embodiment of the present invention.

S1210, an eNB groups an MTC device, or obtains, from another network element, a grouping situation of the MTC device, thereby determining a group ID of a group where the MTC device is located.

S1220, the eNB randomly selects one MTC device from the group where the MTC device is located or generates a random number, and derives a group communication root key KeNB_Group according to a key of the selected MTC device or the random number, where KeNB_Group=KDF (KeNB/RAND, Group ID), and KDF is a key generating function, which may have a definition same as that in the prior art, or may be flexibly defined according to different algorithms. The present invention does not limit a specific form of the KDF.

The eNB further selects a group algorithm including a group integrity algorithm and a group encryption algorithm for the MTC device of the group, calculates the group key including the group encryption key Key_Groupenc and the group integrity key Key_Groupint according to the KeNB_Group and the group algorithm, and establishes the binding relationship between the group ID and the group communication root key, the group algorithm and the group key. Key_Groupenc=KDF (KeNB_Group, Group-enc-alg, Alg-ID), and Key_Groupint=KDF (KeNB_Group, Group-int-alg, Alg-ID), where Group-enc-alg represents that a group encryption algorithm is used in the current calculation, Alg-ID is an algorithm identifier, and Group-int-alg represents that a group integrity algorithm is used in the current calculation. The functions and uses of the group integrity algorithm and the group encryption algorithm are respectively similar to those of the integrity algorithm and the encryption algorithm, and the difference lies in that the group integrity algorithm and the group encryption algorithm are for a group ID, while the integrity algorithm and the encryption algorithm are for an MTC device.

S1230, the eNB sends, to the MTC device, a group algorithm including a group integrity algorithm and a group encryption algorithm and a group key including a group encryption key and a group integrity key, which are encrypted and integrity-protected by using the access stratum key of the MTC device, so that the MTC device performs group communication according to the group algorithm and the group key.

S1240, the MTC device uses the access stratum key of the MTC device to obtain the group algorithm and the group key. In this way, the MTC device may use the group algorithm and the group key shared by a group to perform subsequent group communication normally.

A Sixth Example

Figure 13:
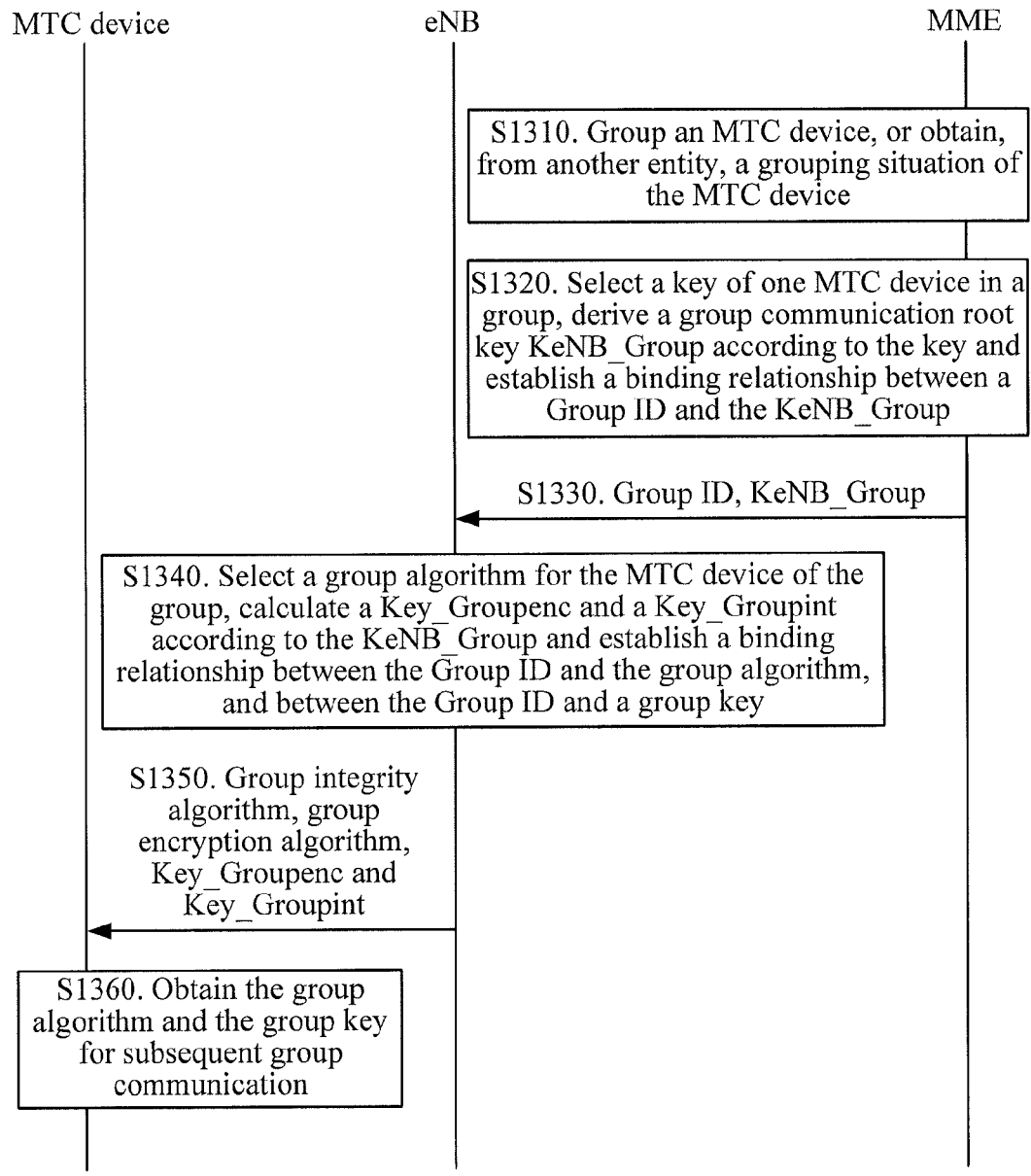
FIG. 13 is a flowchart of a sixth example of generating a group key by using a method according to an embodiment of the present invention.

FIG. 13 is a flowchart of a sixth example of generating a group key by using a method according to an embodiment of the present invention.

S1310, an MME groups an MTC device, or obtains, from another network element, a grouping situation of the MTC device, thereby determining a group ID of a group where the MTC device is located.

S1320, the MME randomly selects one MTC device from the group where the MTC device is located or generates a random number, and derives a group communication root key KeNB_Group according to a key Kasme of the selected MTC device or a random number RAND, where KeNB_Group=KDF (Kasme/RAND, NAS Count, Group ID), where NAS Count is a non-access stratum count value. The MME may also directly use the random number as the KeNB_Group, and establish the binding relationship between the Group ID and the KeNB_Group.

S1330, the MME sends the Group ID and the KeNB_Group to the eNB.

S1340, the eNB selects a group encryption algorithm and a group integrity algorithm for the group where the MTC device is located, and calculates the corresponding Key_Groupenc and Key_Groupint, where the Key_Groupenc=KDF (KeNB_Group, Group-enc-alg, Alg-ID), and Key_Groupint=KDF (KeNB_Group, Group-int-alg, Alg-ID); and establishes a binding relationship between the Group ID and the group integrity algorithm, the group encryption algorithm, the KeNB_Group, the KeNB_Groupenc, and the KeNB_Groupint.

S1350, the eNB sends, to the MTC device, the group integrity algorithm, the group encryption algorithm, the Key_Groupenc and the Key_Groupint, which are encrypted and integrity-protected. The algorithm and key used to perform encryption and integrity protection are the access stratum algorithm and key shared by the MTC device and the network side.

S1360, the MTC device obtains a group algorithm and a group key, and perform subsequent communication by using the group algorithm and the group key.

In addition, in the fifth example and the sixth example, when the MTC device is switched from an IDLE state or a detach state to an ACTIVE state, the MTC device may perform access stratum key synchronization by means of the following process: the MTC device sends a service request message to the network side, after the network side, such as an MME or an eNB, groups the MTC device, when the group ID obtained through grouping has a bound group key, the network side sends the group key bound to the group ID to the MTC device through the access stratum key of the MTC device; and when the group ID obtained through grouping has no bound group key, after generating the group key for the group ID, the network side sends the group key to the MTC device through the access stratum key of the MTC device.

According to the embodiment of the present invention, in the process of group communication between the MTC device and the eNB, the eNB may not need to maintain one PDCP Count value for each MTC device, but maintain one group PDCP Count value for a group of MTC devices. In this way, a PDCP Count value that needs to be maintained by the base station may be reduced, and processing complexity of the base station may be further decreased.

According to the embodiment of the present invention, the PDCP Count value is formed by two parts: an HFN and an SN, and in the process of group communication between the MTC device and the eNB, the eNB may not need to maintain one HFN value for each MTC device, but maintain one group HFN value for a group of MTC devices, where the group HFN is shared by a group of MTC devices, and the SN is decided by a sequence number in a data packet sent by the MTC device. In each MTC device of a group of MTC devices, a PDCP Count value is maintained. An HFN in the PDCP Count value maintains synchronization with a group HFN maintained by the eNB and an HFN of another MTC device, and the SN is maintained by the MTC device separately, and related to the sequence number of the data packet sent by the MTC device.

For uplink, each MTC device maintains one PDCP Count value, and the HFN maintained by each MTC device in the group maintains synchronization with the group HFN maintained by the eNB. The MTC device in the group uses an uplink PDCP Count value to encrypt uplink data, and carries an SN in a header of a packet data unit (Packet Data Unit, PDU) of the uplink data. When receiving a data packet on a common bearer, the eNB uses a Count value formed by the HFN saved by the eNB and the SN carried in the data packet to decrypt the data packet. When the SN in the data packet sent by any one MTC device in the group reaches a threshold, the eNB, after receiving the data packet, increases the group HFN by 1, and notifies each MTC device in the group of a value of the HFN or information that the HFN needs to be increased by 1.

The HFN may have multiple notification manners. For example, for an MTC device with a small traffic volume, the HFN may be set to a fixed value. For another example, when the HFN is changeable, the eNB may send, through respective signaling bearers of all MTC devices in the group corresponding to the group ID, a common signaling bearer or a broadcast channel of the group corresponding to the group ID, the value of the HFN to all MTC devices in the group corresponding to the group ID. The eNB may send the value of the HFN to all MTC devices in the group corresponding to the group ID when the HFN reaches the threshold, or may send, when an MTC device joins the group corresponding to the group ID, the value of the HFN to the MTC device. For another example, when the HFN is changeable, if the HFN corresponding to the group ID reaches a threshold, the eNB may send, to all MTC devices in the group corresponding to the group ID, through respective signaling bearers of all MTC devices in the group corresponding to the group ID, a common signaling bearer or a broadcast channel of the group corresponding to the group ID, indication information used for indicating that the HFN is increased by 1. If the indication information that the HFN needs to be added is broadcast, an initial value for the group HFN needs to be negotiated by the MTC device with the eNB or sent by the eNB to the MTC device. In addition, the eNB may also directly put the PDCP Count value in the header of the PDU and send the PDCP Count value to the MTC device, so that the MTC device may extract the value of the HFN from the header according to the received PDU.

For downlink, if the group communication is based on the common bearer between the eNB and a group of MTC devices, generally, the MTC device in the group receives group information sent by the eNB through the common bearer. In this case, PDCP Count values of MTC devices in the group are consistently changed, so a new PDCP Count value mechanism does not need to be introduced in the downlink.

When the group HFN saved by the eNB reaches the threshold, the eNB updates the group key. When the HFN in the PDCP Count value in the MTC device reaches the threshold, the MTC device also updates the group key. The MTC device may determine, in multiple manners, that the HFN reaches the threshold. For example, the eNB may notify the MTC device of the value of the HFN or the indication that the HFN is increased by 1, so that after changing the HFN, the MTC device determines that the HFN reaches the threshold, thereby updating the group key. For another example, the eNB may directly notify the MTC device of the indication that the HFN reaches the threshold, so that the MTC device updates the group key.

The eNB may update the group key in two manners.

In one manner, first update the KeNB_Group, and then use the updated KeNB_Group to calculate the Key_Groupenc and the Key_Groupint. In the updating manner, KeNB_Group*=KDF (KeNB_Group, Cell ID, Group ID) or KeNB_Group*=KDF (KeNB_Group, cell ID, Group ID, Key Count).

In the other manner, directly update the Key_Groupenc and the Key_Groupint. In the updating manner, Key_Groupenc*=KDF (Key_Groupenc, Cell ID, Group ID), and Key_Groupint*=KDF (Key_Groupint, Cell ID, Group ID).

In the embodiment of the present invention, to further ensure the security of communication, the network side may update the group communication root key when a certain condition is satisfied. When the certain condition is satisfied, the network side updates the group root key KeNB_Group, and generates a new group key according to the updated group communication root key, so as to perform group communication by using the new group key. The certain condition may be that when a timer maintained by the network side reaches the threshold; or when the Key Count value maintained by the eNB reaches the threshold; or when a count value that is for a group or a service and maintained by the MME reaches the threshold. When the MME receives NAS signaling sent by the MTC device belonging to a group or a service, the count value is increased by 1.

Figure 14:
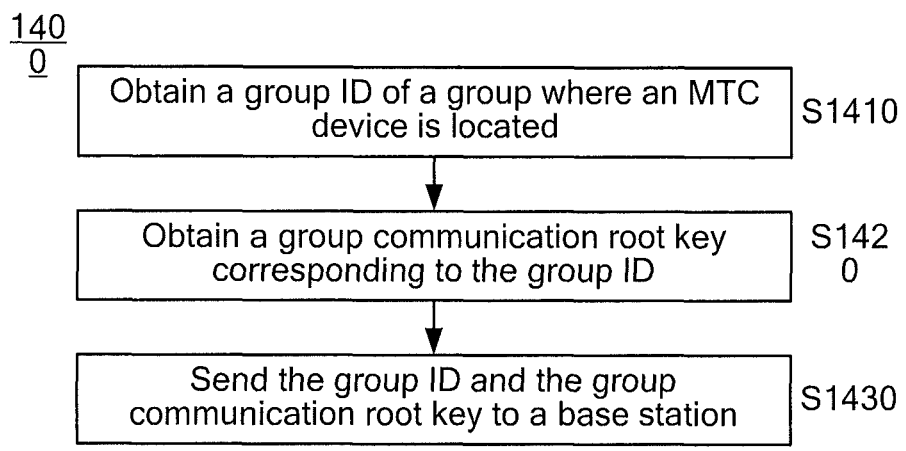
FIG. 14 is a flowchart of another method for generating a group key according to an embodiment of the present invention.

With reference to FIG. 14, the following describes a method 1400 for generating a group key according to an embodiment of the present invention.

As shown in FIG. 14, the method 1400 includes:

S1410: obtain a group ID of a group where an MTC device is located.

S1420: obtain a group communication root key corresponding to the group ID.

S1430: send the group ID and the group communication root key to a base station, so that the base station generates a group key corresponding to the group ID according to the group communication root key and sends the group key encrypted by using an access stratum key of the MTC device to the MTC device.

For example, the method 1400 may be executed by an MME. By grouping the MTC device, the MME may further determine a group communication root key corresponding to a group ID of a group where the MTC device is located. The MME sends the group ID and the group communication root key to the base station, so that the base station generates the group key, encrypts the group key and sends the encrypted group key to the MTC device, thereby completing allocation of the group key.

Because a same group is corresponding to a group communication root key, and the group key is derived from the group communication root key, MTC devices in the same group may use the same group key to perform group communication normally, and the base station only needs to maintain the same group key for the same group, thereby decreasing operation complexity of the base station, reducing the number of keys maintained and managed by the base station, and improving performance of the base station.

S1410, the MME may obtain the group ID of the group where the MTC is located in multiple manners. For example, the MME may group the MTC device, thereby grouping the MTC device into a group corresponding to the group ID. For another example, the MME may obtain, from another network element, the group ID of the group where the MTC device is located. For another example, the MME may receive the group ID sent by the MTC device.

According to the embodiment of the present invention, when the MME receives the group ID sent by the MTC device to obtain the group ID in S1410, S1420, the MME may obtain the group communication root key corresponding to the group ID in the following manner: sending the group ID to an HSS to which the MTC device belongs, so that the HSS generates a first parameter according to a random number and a set key corresponding to the group ID; receiving the first parameter from the HSS; and generating a group communication root key corresponding to the group ID according to the first parameter.

According to the embodiment of the present invention, when the group ID is not bound to the first parameter corresponding to the group ID, the MME sends the group ID to the HSS. After the MME receives the first parameter from the HSS, the MME may bind and store the first parameter and the group ID. In this way, when the MME receives an attach request that carries the group ID and is sent by another MTC device, the MME may obtain, according to the group ID, the first parameter bound to the group ID; generate a group communication root key corresponding to the group ID according to the first parameter; and send the group ID and the group communication root key to the base station.

According to an embodiment of the present invention, after the MME sends the group ID to the HSS to which the MTC device belongs, the MME may receive a group authentication parameter from the HSS, where the group authentication parameter is generated by the HSS according to the set key corresponding to the group ID, or generated by the HSS according to the set key corresponding to the group ID and an exclusive key of the MTC device; and perform authentication with the MTC device according to the group authentication parameter. In this case, after the MTC device performs authentication with the network side successfully, the MME generates the group communication root key corresponding to the group ID according to the first parameter. Herein, the exclusive key of the MTC device may be a K of the MTC device, where the K may be stored in a USIM, and when the USIM is inserted into an MTC device, the USIM becomes a part of the MTC device.

For related embodiments, reference may be made to the description in the first example to the fourth example, and details are not repeatedly described herein to avoid repetition.

S1420, the MME may further obtain the group communication root key corresponding to the group ID in the following manner: selecting an MTC device from MTC devices in the group ID, and determining the group communication root key corresponding to the group ID according to a key of the selected MTC device; or generating a random number, and determining a group communication root key corresponding to the group ID according to the random number. The MME may obtain, through derivation, the group communication root key corresponding to the group ID according to the KeNB of the selected MTC device, or may directly use the KeNB of the selected MTC device as the group communication root key corresponding to the group ID. Likewise, the MME may obtain, through derivation, the group communication root key corresponding to the group ID according to the random number, or may directly use the random number as the group communication root key corresponding to the group ID.

According to the embodiment of the present invention, after obtaining the group communication root key corresponding to the group ID, the MME may bind and store the group ID and the group communication root key. In this way, when it is determined that another MTC device belongs to the group corresponding to the group ID, the bound group communication root key is obtained according to the group ID; and the group ID and the group communication root key are sent to the base station. The bound group communication root key is directly obtained, thereby reducing processing complexity of repeatedly generating the group communication root key, and ensuring consistency of the group communication root key corresponding to the same group ID.

For related embodiments, reference may be made to the description in the fifth example and the sixth example, and details are not repeatedly described herein to avoid repetition.

In addition, according to the embodiment of the present invention, when a pre-determined timer maintained by the network side reaches a first pre-determined threshold, or when the number of times that the base station updates the group key reaches a second pre-determined threshold, or when a maintained non-access stratum count value reaches a third pre-determined threshold, re-authentication is performed with the MTC device or a new group communication root key corresponding to the group ID is obtained. In this way, the group key may be updated after certain time, which avoids introduction of insecurity factors due to long time of using the same group key, thereby further improving the security of the group communication.

Figure 15:
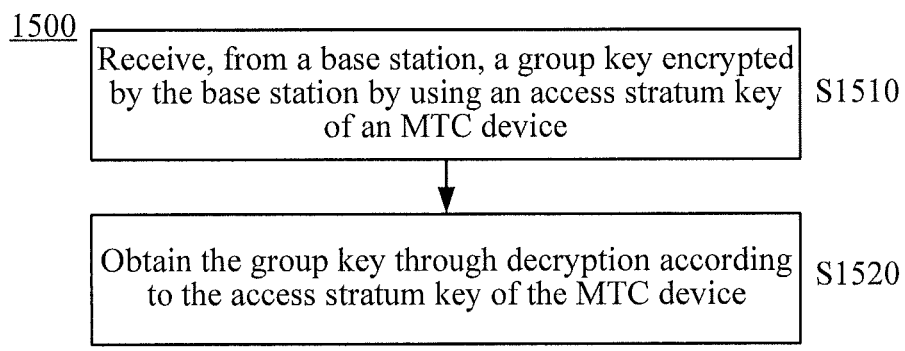
FIG. 15 is a flowchart of still another method for generating a group key according to an embodiment of the present invention.

The following describes a method 1500 for generating a group key according to an embodiment of the present invention with reference to FIG. 15.

As shown in FIG. 15, the method 1500 includes:

S1510, receive, from a base station, a group key encrypted by the base station by using an access stratum key of an MTC device, where the group key is generated by the base station according to a group communication root key obtained by the base station, and is corresponding to a group ID of a group where the MTC device is located, where the group ID is obtained by the base station; or the group key is generated by the base station according to a group communication root key obtained from an MME, and is corresponding to a group ID of a group where the MTC device is located, where the group ID is obtained by the MME.

S1520: obtain the group key through decryption according to the access stratum key of the MTC device.

For example, the method 1500 may be executed by an MTC device. The operation of the MTC device is corresponding to the operation of the base station and the MME, and therefore, for the description of steps in the method 1500, reference may be made to the description in the method 100 and the method 1400. For specific embodiments, reference may be made to the first example to the sixth example, and details are not repeatedly described herein to avoid repetition.

According to the embodiment of the present invention, all MTC devices of a same group ID share a same HFN. To ensure that the same group ID corresponds to the same HFN, the HFN corresponding to the group ID may be preset to a fixed value, or the base station may notify the MTC device of information related to a value of the HFN. For example, the MTC device may receive the value of the HFN from the base station through a signaling bearer of the MTC device, a common signaling bearer or a broadcast channel of a group corresponding to the group ID; or the MTC device may receive, from the base station, indication information used for indicating that the HFN is increased by 1, through a signaling bearer of the MTC device, a common signaling bearer or a broadcast channel of a group corresponding to the group ID when the HFN corresponding to the group ID reaches a threshold.

To further improve the security of the group communication, the network side may update the group key, and the MTC device needs to perform group communication by using the updated group key. According to an embodiment of the present invention, the MTC device may obtain, from the base station, the updated group key encrypted by using the access stratum key of the MTC device, where the updated group key is obtained by the base station by updating the group key when the HFN corresponding to the group ID reaches the threshold; and obtain the updated group key through decryption according to the access stratum key of the MTC device.

When a pre-determined timer maintained by the network side reaches a first pre-determined threshold, or when the number of times that the base station updates the group key reaches a second pre-determined threshold, or when a non-access stratum count value maintained by the MME reaches a third pre-determined threshold, re-authentication is performed with the MME or, a new group key encrypted by the base station by using the access stratum key of the MTC device is obtained from the base station. In this way, the group key may be updated after certain time, which avoids introduction of insecurity factors due to long time of using the same group key, thereby further improving the security of the group communication.

According to the method for generating a group key provided by the embodiment of the present invention, a network side determines a group ED of a group where an MTC device is located, so as to determine a group key corresponding to the group ID, and by means of an access stratum key of the MTC device, a group key used by the MTC device may be securely allocated to the MTC device, so that MTC devices in a same group ID share a same group key. In this way, the MTC devices in the same group may use the same group key to perform group communication normally, and the base station only needs to maintain the same group key for the same group, thereby decreasing operation complexity of the base station, reducing the number of keys maintained and managed by the base station, and improving performance of the base station.

The method for generating a group key is described in the foregoing from the perspective of the base station, the MME and the MTC device separately, and the following describes related devices with reference to FIG. 16 to FIG. 21.

Figure 16:
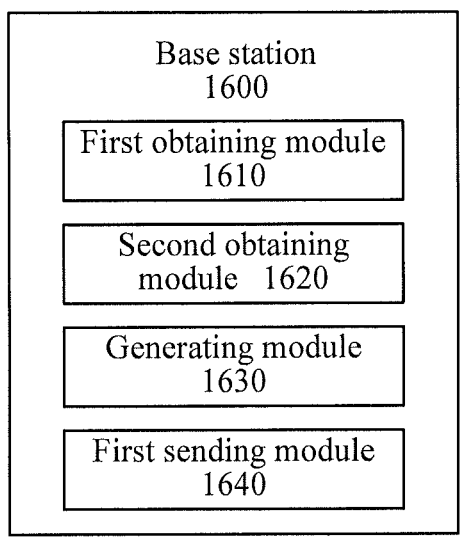
FIG. 16 is a structural block diagram of a base station according to an embodiment of the present invention.

FIG. 16 is a structural block diagram of a base station 1600 according to an embodiment of the present invention.

The base station 1600 includes a first obtaining module 1610, a second obtaining module 1620, a generating module 1630 and a first sending module 1640. The first obtaining module 1610 may be implemented through an input interface and/or a processor, the second obtaining module 1620 may be implemented through an input interface and/or a processor, the generating module 1630 may be implemented through a processor, and the first sending module 1640 may be implemented through an output interface.

The first obtaining module 1610 is configured to obtain a group ED of a group where an MTC device is located. The second obtaining module 1620 is configured to obtain a group communication root key corresponding to the group ID. The generating module 1630 is configured to generate a group key corresponding to the group ID according to the group communication root key. The first sending module 1640 is configured to send the group key encrypted by using an access stratum key of the MTC device to the MTC device, so that the MTC device obtains the group key through decryption according to the access stratum key of the MTC device.

For the foregoing and other operations and/or functions of the first obtaining module 1610, the second obtaining module 1620, the generating module 1630 and the first sending module 1640, reference may be made to the description in the method 100 and the first example to the sixth example, and details are not repeatedly described herein to avoid repetition.

The base station provided according to the embodiment of the present invention determines a group ID of a group where an MTC device is located, so as to determine a group key corresponding to the group ID, and by means of an access stratum key of the MTC device, a group key used by the MTC device may be securely allocated to the MTC device, so that MTC devices in a same group ID share a same group key. In this way, the MTC devices in the same group may use the same group key to perform group communication normally, and the base station only needs to maintain the same group key for the same group, thereby decreasing operation complexity of the base station, reducing the number of keys maintained and managed by the base station, and improving performance of the base station.

Figure 17:
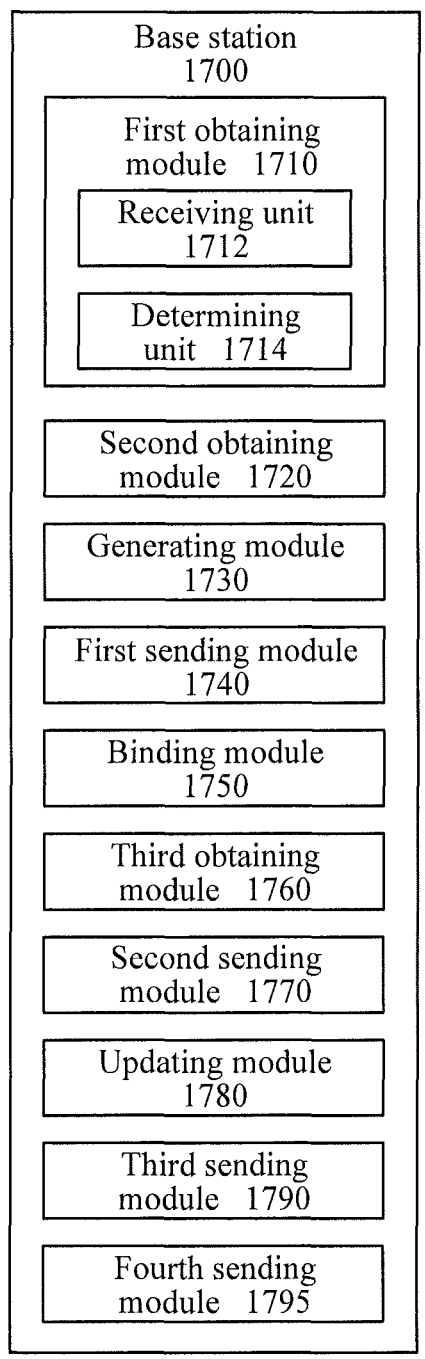
FIG. 17 is a structural block diagram of another base station according to an embodiment of the present invention.

FIG. 17 is a structural block diagram of a base station 1700 according to an embodiment of the present invention.

A first obtaining module 1710, a second obtaining module 1720, a generating module 1730 and a first sending module 1740 of the base station 1700 are basically the same as the first obtaining module 1610, the second obtaining module 1620, the generating module 1630 and the first sending module 1640 of the base station 1600.

According to the embodiment of the present invention, the first obtaining module 1710 may be specifically configured to group an MTC device into a group corresponding to a group ID; or obtain, from another network element, a group ID of a group where an MTC device is located.

According to the embodiment of the present invention, the second obtaining module 1720 may be specifically configured to select an MTC device from MTC devices in the group ID, and determine a group communication root key corresponding to the group ID according to a key of the selected MTC device. Or, the second obtaining module 1720 may be specifically configured to receive the group communication root key corresponding to the group ID from the MME, where the MME groups the MTC device into the group corresponding to the group ID, selects the MTC device from the MTC devices in the group ID, and determines the group communication root key corresponding to the group ID according to a key of the selected MTC device, or the MME determines the group communication root key corresponding to the group ID according to a random number generated by the MME. Or, the second obtaining module 1720 may specifically be configured to generate a random number, and determine the group communication root key corresponding to the group ID according to the random number.

According to an embodiment of the present invention, the first obtaining module 1710 and the second obtaining module 1720 may be specifically configured to receive a group ID and a group communication root key from an MME, where the group communication root key is generated by a home subscriber system HSS of an MTC device according to a random number and a set key corresponding to the group ID, or the group communication root key is generated by the HSS when receiving the group ID from an MTC device that is forwarded by the MME, according to the random number, the group ID and an exclusive key of the one MTC device, and the HSS sends the group communication root key to the MME.

According to an embodiment of the present invention, the first obtaining module 1710 may include a receiving unit 1712 and a determining unit 1714. The receiving unit 1712 may be configured to receive, from an MME, a service ID and a service root key corresponding to the service ID, where the service ID is a service ID of a service of the MTC device, which is sent to the MME by the MTC device, and the service root key is generated, according to a random number and a set key corresponding to the service ID, by an HSS to which the MTC device belongs, or the service root key is generated according to the random number, the service ID and an exclusive key of one MTC device by the HSS when the HSS receives the service ID from the one MTC device that is forwarded by the MME, and the HSS sends the service root key to the MME. The determining unit 1714 may be configured to determine, according to the service ID, the group ID of the group where the MTC device is located. In this case, the second obtaining module 1720 may be configured to generate the group communication root key corresponding to the group ID according to the service root key.

According to the embodiment of the present invention, the base station 1700 may further include a binding module 1750, a third obtaining module 1760 and a second sending module 1770. The binding module 1750 may be configured to bind and store the group communication root key, the group key and the group ID. The third obtaining module 1760 is configured to: when it is determined that another MTC device belongs to the group corresponding to the group ID, obtain the bound group key according to the group ID. The second sending module 1770 is configured to send the group key encrypted by using an access stratum key of the another MTC device to the another MTC device, so that the another MTC device obtains the group key through decryption according to the access stratum key of the another MTC device.

According to the embodiment of the present invention, all MTC devices of a same group ID may share a same HFN. In this way, a PDCP Count value that needs to be maintained by the base station may be reduced, and processing complexity of the base station may be further decreased. In this case, the base station 1700 may further include an updating module 1780 and a third sending module 1790. The updating module 1780 is configured to update the group key when an HFN corresponding to the group ID reaches a threshold. The third sending module 1790 is configured to send the updated group key encrypted by using an access stratum key of the MTC device to the MTC device, so that the MTC device obtains the updated group key through decryption according to the access stratum key of the MTC device. In this way, introduction of insecurity factors due to long time of using the same group key may be avoided, thereby further improving communication security.

To ensure that all MTC devices in the same group ID share the same HFN, an HFN corresponding to the group ID may be preset to a fixed value or the base station may notify information related to the HFN. According to the embodiment of the present invention, the base station 1700 may further include a fourth sending module 1795. The fourth sending module 1795 may be configured to: through respective signaling bearers of all MTC devices in the group corresponding to the group ID, a common signaling bearer or a broadcast channel of the group corresponding to the group ID, send the value of the HFN to all MTC devices in the group corresponding to the group ID. Alternatively, the fourth sending module 1795 may be configured to: when the HFN corresponding to the group ID reaches a threshold, through respective signaling bearers of all MTC devices in the group corresponding to the group ID, a common signaling bearer or a broadcast channel of the group corresponding to the group ID, send indication information used for indicating that the HFN is increased by 1 to all MTC devices in the group corresponding to the group ID.

For the foregoing and other operations and/or functions of the first obtaining module 1710, the second obtaining module 1720, the receiving unit 1712, the determining unit 1714, the binding module 1750, the third obtaining module 1760, the second sending module 1770, the updating module 1780, the third sending module 1790 and the fourth sending module 1795, reference may be made to the description in the method 100 and the first example to the sixth example, and details are not repeatedly described to avoid repetition. The binding module 1750, the third obtaining module 1760 and the updating module 1780 may be implemented through a processor, and the second sending module 1770, the third sending module 1790 and the fourth sending module 1795 may be implemented through an output interface.

According to the base station provided by the embodiment of the present invention, the base station may send a same group key to MTC devices in a same group, so that the MTC devices in the same group may use the same group key to perform group communication normally, and the base station only needs to maintain the same group key for the same group, thereby decreasing operation complexity of the base station, reducing the number of keys maintained and managed by the base station, and improving the performance of the base station.

Figure 18:
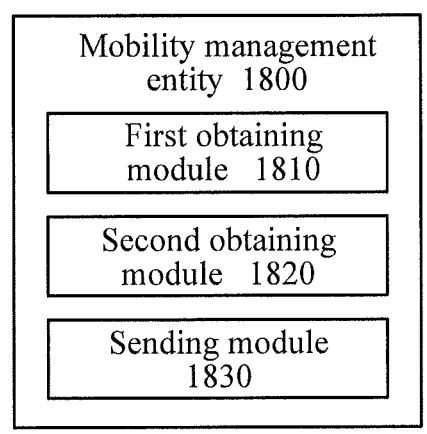
FIG. 18 is a structural block diagram of a mobility management entity according to an embodiment of the present invention.

FIG. 18 is a structural block diagram of a mobility management entity 1800 according to an embodiment of the present invention.

The mobility management entity 1800 includes a first obtaining module 1810, a second obtaining module 1820 and a sending module 1830. The first obtaining module 1810 and the second obtaining module 1820 may be implemented through an input interface and/or a processor, and the sending module 1830 may be implemented through an output interface.

The first obtaining module 1810 is configured to obtain a group ID of a group where an MTC device is located. The second obtaining module 1820 is configured to obtain a group communication root key corresponding to the group ID. The sending module 1830 is configured to send the group ID and the group communication root key to a base station, so that the base station generates a group key corresponding to the group ID according to the group communication root key and sends the group key encrypted by using an access stratum key of the MTC device to the MTC device.

For the foregoing and other operations and/or functions of the first obtaining module 1810, the second obtaining module 1820 and the sending module 1830, reference may be made to the description in the method 1400 and the first example to the sixth example, and details are not repeatedly described herein to avoid repetition.

According to the mobility management entity provided by the embodiment of the present invention, a group ID of a group where an MTC device is located and a group communication root key are determined, so that a base station may determine a group key corresponding to the group ID, and encrypt, through an access stratum key of the MTC device, the group key used by the MTC device, to securely send the encrypted group key to the MTC device, so that MTC devices in a same group ID may share a same group key. In this way, the MTC devices in the same group may use the same group key to perform group communication normally, and the base station only needs to maintain the same group key for the same group, thereby decreasing operation complexity of the base station, reducing the number of keys maintained and managed by the base station, and improving performance of the base station.

Figure 19:
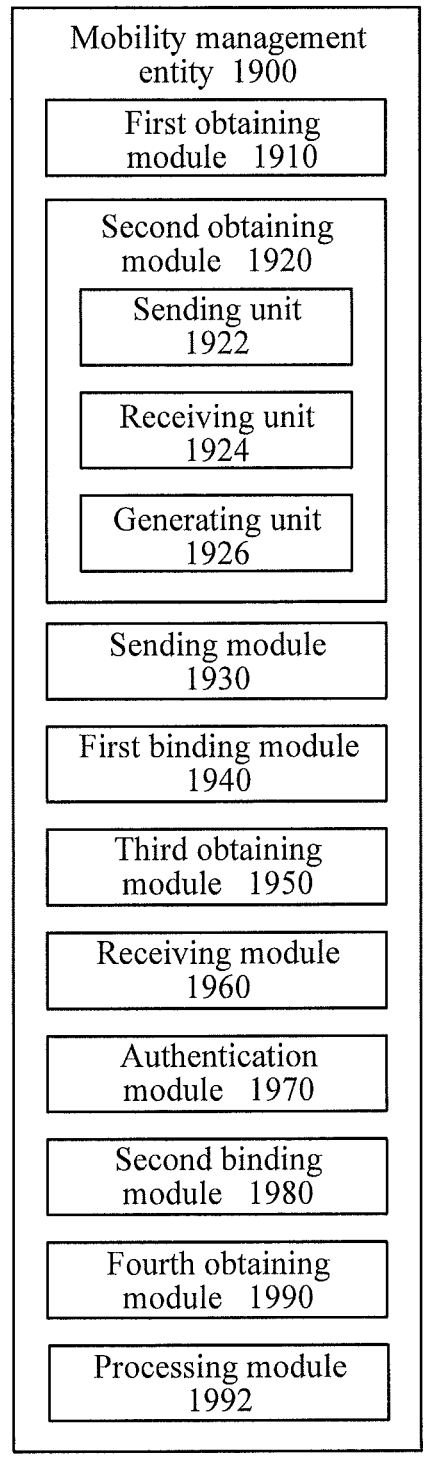
FIG. 19 is a structural block diagram of another mobility management entity according to an embodiment of the present invention.

FIG. 19 is a structural block diagram of a mobility management entity 1900 according to an embodiment of the present invention.

A first obtaining module 1910, a second obtaining module 1920 and a sending module 1930 of the mobility management entity 1900 are basically the same as the first obtaining module 1810, the second obtaining module 1820 and the sending module 1830 of the mobility management entity 1800.

According to the embodiment of the present invention, the first obtaining module 1910 may be specifically configured to group an MTC device into a group corresponding to a group ID. Or, the first obtaining module 1910 may be specifically configured to obtain, from another network element, a group ID of a group where an MTC device is located. Or, the first obtaining module 1910 may be specifically configured to receive a group ID sent by an MTC device.

According to the embodiment of the present invention, the first obtaining module 1910 may be further specifically configured to receive the group ID sent by the MTC device. In this case, the second obtaining module 1920 may include a sending unit 1922, a receiving unit 1924 and a generating unit 1926. The sending unit 1922 is configured to send the group ID to an HSS to which the MTC device belongs, so that the HSS generates a first parameter according to a random number and a set key corresponding to the group ID. The receiving unit 1924 is configured to receive the first parameter from the HSS. The generating unit 1926 is configured to generate a group communication root key corresponding to the group ID according to the first parameter. The sending unit 1922 may be specifically configured to send the group ID to the HSS to which the MTC device belongs when the group ID is not bound to the first parameter corresponding to the group ID.

According to the embodiment of the present invention, the mobility management entity 1900 may further include a first binding module 1940 and a third obtaining module 1950. The first binding module 1940 may be configured to bind and store the first parameter and the group ID. The third obtaining module 1950 may be configured to: when receiving an attach request that carries the group ID and is sent by another MTC device, obtain, according to the group ID, the first parameter bound to the group ID, so that the generating unit 1926 generates a group communication root key corresponding to the group ID according to the first parameter.

According to the embodiment of the present invention, the mobility management entity 1900 may further include a receiving module 1960 and an authentication module 1970. The receiving module 1960 is configured to receive a group authentication parameter from the HSS, where the group authentication parameter is generated by the HSS according to a set key corresponding to the group ID, or generated by the HSS according to a set key corresponding to the group ID and an exclusive key of the MTC device. The authentication module 1970 is configured to perform authentication with the MTC device according to the group authentication parameter. In this case, the generating unit 1926 may be configured to: after the MTC device performs authentication with a network side successfully, generate the group communication root key corresponding to the group ID according to the first parameter.

According to the embodiment of the present invention, the second obtaining module 1920 may be specifically configured to select one MTC device from MTC devices in the group ID, and determine a group communication root key corresponding to the group ID according to a key of the selected MTC device. The second obtaining module 1920 may further be specifically configured to generate a random number, and determine the group communication root key corresponding to the group ID according to the random number.

The mobility management entity 1900 may further include a second binding module 1980 and a fourth obtaining module 1990. The second binding module 1980 may be configured to bind and store the group ID and the group communication root key. The fourth obtaining module 1990 may be configured to: when it is determined that another MTC device belongs to the group corresponding to the group ID, obtain the bound group communication root key according to the group ID, so that the sending module 1930 sends the group ID and the group communication root key to the base station.

According to the embodiment of the present invention, the mobility management entity 1900 may further include a processing module 1992. The processing module 1992 may be configured to: when a pre-determined timer maintained by the network side reaches a first pre-determined threshold, or when the number of times that the base station updates the group key reaches a second pre-determined threshold, or when a maintained non-access stratum count value reaches a third pre-determined threshold, perform re-authentication with the MTC device or obtain a new group communication root key corresponding to the group ID.

For the foregoing and other operations and/or functions of the first obtaining module 1910, the second obtaining module 1920, the sending unit 1922, the receiving unit 1924, the generating unit 1926, the first binding module 1940, the third obtaining module 1950, the receiving module 1960, the authentication module 1970, the second binding module 1980, the fourth obtaining module 1990 and the processing module 1992, reference may be made to the description in the method 1400 and the first example to the sixth example, and details are not repeatedly described herein to avoid repetition. The first binding module 1940, the third obtaining module 1950, the authentication module 1970, the second binding module 1980 and the fourth obtaining module 1990 may be implemented through a processor, the receiving module 1960 may be implemented through an input interface, and the processing module 1992 may be implemented through a processor and/or an input interface.

According to the mobility management entity provided by the embodiment of the present invention, the mobility management entity sends a group ID and a group communication root key to a base station, so that the base station may send a same group key to MTC devices in a same group, and therefore, the MTC devices in the same group may use the same group key to perform group communication normally, and the base station only needs to maintain the same group key for the same group. In this way, operation complexity of the base station may be decreased, the number of keys maintained and managed by the base station may be reduced, and performance of the base station may be improved.

Figure 20:
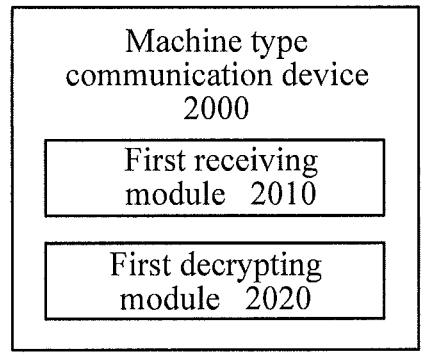
FIG. 20 is a structural block diagram of a machine type communication device according to an embodiment of the present invention.

FIG. 20 is a structural block diagram of a machine type communication device 2000 according to an embodiment of the present invention.

The machine type communication device 2000 includes a first receiving module 2010 and a first decrypting module 2020, where the first receiving module 2010 may be implemented through an input interface, and the first decrypting module 2020 may be implemented through a processor.

The first receiving module 2010 is configured to receive, from a base station, a group key encrypted by the base station by using an access stratum key of the MTC device, where the group key is generated by the base station according to a group communication root key obtained by the base station, and is corresponding to a group ID of a group where the MTC device is located, where the group ID is obtained by the base station; or the group key is generated by the base station according to a group communication root key obtained from an MME, and is corresponding to a group ID of a group where the MTC device is located, where the group ID is obtained by the MME. The first decrypting module 2020 is configured to obtain the group key through decryption according to the access stratum key of the MTC device.

For the foregoing and other operations and/or functions of the first receiving module 2010 and the first decrypting module 2020, reference may be made to the description in the method 1500 and the first example to the sixth example, and details are not repeatedly described herein to avoid repetition.

According to the machine type communication device provided by the embodiment of the present invention, by receiving, from a base station, a group key corresponding to a group where the machine type communication device is located, the machine type communication device may share a same group key with another MTC device in a same group to perform group communication normally, and the base station only needs to maintain the same group key for the same group, thereby decreasing operation complexity of the base station, reducing the number of keys maintained and managed by the base station, and improving performance of the base station.

Figure 21:
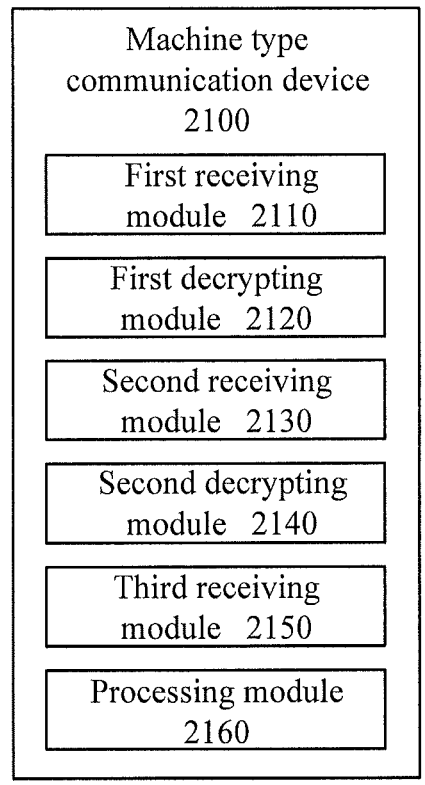
FIG. 21 is a structural block diagram of another machine type communication device according to an embodiment of the present invention.

FIG. 21 is a structural block diagram of a machine type communication device 2100 according to an embodiment of the present invention.

A first receiving module 2110 and a first decrypting module 2120 of the machine type communication device 2100 are basically the same as the first receiving module 2010 and the first decrypting module 2020 of the machine type communication device 2000.

According to the embodiment of the present invention, all MTC devices of a same group ID may share a same HFN. In this way, a base station may maintain one PDCP Count value for the same group ID, thereby further reducing the processing complexity of the base station.

The machine type communication device 2100 may further include a second receiving module 2130 and a second decrypting module 2140. The second receiving module 2130 is configured to receive, from the base station, an updated group key encrypted by using an access stratum key of the MTC device, where the updated group key is obtained by the base station by updating the group key when an HFN corresponding to the group ID reaches a threshold. The second decrypting module 2140 is configured to obtain the updated group key through decryption according to the access stratum key of the MTC device.

To make the MTC devices in the same group share a same HFN, the HFN corresponding to the group ID may be preset to a fixed value, or the MTC device may receive, from the base station, information related to a value of the HFN. According to the embodiment of the present invention, the machine type communication device 2100 may include a third receiving module 2150. The third receiving module 2150 may be configured to receive the value of the HFN from the base station through a signaling bearer of the MTC device, a common signaling bearer or a broadcast channel of the group corresponding to the group ID. The third receiving module 2150 may also be configured to: when the HFN corresponding to the group ID reaches the threshold, receive, from the base station, indication information used for indicating that the HFN is increased by 1 through a signaling bearer of the MTC device, a common signaling bearer or a broadcast channel of a group corresponding to the group ID.

In addition, to avoid introduction of insecurity factors due to long time of using the same group key, when a certain condition is satisfied, the group key may be updated, so as to further improve the security of group communication.

According to the embodiment of the present invention, the machine type communication device 2100 may further include a processing module 2160. The processing module 2160 may be configured to: when a pre-determined timer maintained by a network side reaches a first pre-determined threshold, or when the number of times that the base station updates the group key reaches a second pre-determined threshold, or when a non-access stratum count value maintained by the MME reaches a third pre-determined threshold, perform re-authentication with the MME or obtain, from the base station, a new group key encrypted by the base station by using the access stratum key of the MTC device.

For the foregoing and other operations and/or functions of the second receiving module 2130 and the second decrypting module 2140, the third receiving module 2150 and the processing module 2160, reference may be made to the description in the method 1500 and the first example to the sixth example, and details are not repeatedly described herein to avoid repetition. The second receiving module 2130 and the third receiving module 2150 may be implemented through an input interface, the second decrypting module 2140 may be implemented through a processor, and the processing module 2160 may be implemented through a processor and/or an input interface.

According to the machine type communication device provided by the embodiment of the present invention, by receiving, from a base station, a group key corresponding to a group where the machine type communication device is located, MTC devices in a same group can use a same group key to perform group communication normally, and the base station only needs to maintain the same group key for the same group. In this way, operation complexity of the base station may be decreased, the number of keys maintained and managed by the base station may be reduced, and performance of the base station may be improved.

A person of ordinary skill in the art may be aware that, steps and units of each method described in combination with the embodiments disclosed herein may be implemented by electronic hardware, or a combination of computer software and electronic hardware. To clearly describe the interchangeability between the hardware and the software, the foregoing has generally described compositions and steps of each embodiment according to functions. Whether the functions are performed in a hardware or software manner depends on particular applications and design constraint conditions of the technical solution. A person skilled in the art may use different methods to implement the described functions for each particular application, but it should not be considered that the implementation goes beyond the scope of the present invention.

The steps of the method described in combination with the embodiments disclosed herein may be implemented by hardware, a software program executed by a processor, or a combination of the hardware and software program. The software program may reside in a random access memory (RAM), a memory, a read-only memory (ROM), an electrically programmable ROM, an electrically erasable programmable ROM, a register, a hard disk, a removable disk, a CD-ROM, or any other forms of storage mediums known in the art.

Although some embodiments of the present invention are shown and described, a person skilled in the art should understand that, various modifications may be made to the embodiments without departing from the principle and spirit of the present invention, and such modifications shall fall within the scope of the present invention.

What is claimed is:

1. A method for generating a group key, comprising:
   obtaining a group ID of a group to which a machine type communication MTC device of a plurality of MTC devices belongs;
   obtaining a group communication root key corresponding to the group ID of the group to which the MTC device of the plurality of MTC devices belongs;
   generating a group key corresponding to the group ID according to the group communication root key;
   sending the group key encrypted by using an access stratum key of the MTC device to the MTC device, so that the MTC device obtains the group key through decryption according to the access stratum key of the MTC device; and
   using the group key to encrypt normal communication with the plurality of MTC devices belonging to the group by the MTC device,
   wherein the obtaining the group ID of the group to which the MTC device belongs comprises:
   receiving, from a mobility management entity MME, a service ID and a service root key corresponding to the service ID, wherein the service ID is a service ID of a service of the MTC device, which is sent to the MME by the MTC device, and the service root key is generated, according to a random number and a set key corresponding to the service ID, by an HSS to which the MTC device belongs, or the service root key is generated according to the random number, the service ID and an exclusive key of one MTC device by the HSS when the HSS receives the service ID from the one MTC device that is forwarded by the MME, and the HSS sends the service root key to the MME; and
   determining, according to the service ID, the group ID of the group to which the MTC device belongs; and
   the obtaining the group communication root key corresponding to the group ID comprises:
   generating the group communication root key corresponding to the group ID according to the service root key.

2. The method according to claim 1, wherein the obtaining a group ID of a group to which an MTC device belongs comprises:
   grouping the MTC device into a group corresponding to the group ID; or
   obtaining, from another network element, the group ID of the group to which the MTC device belongs.

3. The method according to claim 1, wherein the obtaining a group communication root key corresponding to the group ID comprises:
   selecting the MTC device from the plurality of MTC devices with the group ID, and
   determining the group communication root key corresponding to the group ID according to a key of the selected MTC device; or
   receiving the group communication root key corresponding to the group ID from a mobility management entity MME, wherein the MME groups the MTC device into the group corresponding to the group ID, selects the MTC device from the plurality of the MTC devices with the group ID, and determines the group communication root key corresponding to the group ID according to a key of the selected MTC device, or the MME determines the group communication root key corresponding to the group ID according to a random number generated by the MME; or
   generating a random number, and determining the group communication root key corresponding to the group ID according to the random number.

4. The method according to claim 1, wherein the obtaining a group ID of a group to which an MTC device belongs, and obtaining a group communication root key corresponding to the group ID comprises:
   receiving the group ID and the group communication root key from a mobility management entity MME, wherein the group communication root key is generated, according to a random number and a set key corresponding to the group ID, by a home subscriber system HSS to which the MTC device belongs, or the group communication root key is generated according to the random number, the group ID and an exclusive key of one MTC device by the HSS when the HSS receives the group ID from the one MTC device that is forwarded by the MME, and the HSS sends the group communication root key to the MME.

5. The method according to claim 1, wherein after the generating a group key corresponding to the group ID according to the group communication root key, the method further comprises:
   binding and storing the group communication root key, the group key and the group ID;
   when it is determined that another MTC device belongs to the group corresponding to the group ID, obtaining the bound group key according to the group ID; and
   sending the group key encrypted by using an access stratum key of the another MTC device to the another MTC device, so that the another MTC device obtains the group key through decryption according to the access stratum key of the another MTC device.

6. A base station, comprising:
   a processor, configured to obtain a group ID of a group to which a machine type communication MTC device of a plurality of MTC devices belongs;
   the processor, configured to obtain a group communication root key corresponding to the group ID of the group to which the MTC device of the plurality of MTC devices belongs;
   the processor, configured to generate a group key corresponding to the group ID according to the group communication root key; and
   a transmitter configured to send the group key encrypted by using an access stratum key of the MTC device to the MTC device, so that the MTC device obtains the group key through decryption according to the access stratum key of the MTC device; and
   the MTC device configured to encrypt communications with the plurality of MTC devices belonging to the group using the group key,
   wherein the processor specifically is configured to:
   receive, from a mobility management entity MME, a service ID and a service root key corresponding to the service ID, wherein the service ID is a service ID of a service of the MTC device, which is sent to the MME by the MTC device, and the service root key is generated, according to a random number and a set key corresponding to the service ID, by an HSS to which the MTC device belongs, or the service root key is generated according to the random number, the service ID and an exclusive key of one MTC device by the HSS when the HSS receives the service ID from the one MTC device that is forwarded by the MME, and the HSS sends the service root key to the MME; and determine, according to the service ID, the group ID of the group to which the MTC device belongs; and generate the group communication root key corresponding to the group ID according to the service root key.

7. The base station according to claim 6, wherein the processor is configured to group the MTC device into a group corresponding to the group ID; or obtain, from another network element, the group ID of the group to which the MTC device belongs.

8. The base station according to claim 6, wherein the processor is configured to:

select the MTC device from the plurality of MTC devices with the group ID, and determine the group communication root key corresponding to the group ID according to a key of the selected MTC device; or receive the group communication root key corresponding to the group ID from a mobility management entity MME, wherein the MME groups the MTC device into the group corresponding to the group ID, selects the MTC device from the plurality of MTC devices with the group ID, and determines the group communication root key corresponding to the group ID according to a key of the selected MTC device, or the MME determines the group communication root key corresponding to the group ID according to a random number generated by the MME; or generate a random number, and determine the group communication root key corresponding to the group ID according to the random number.

9. The base station according to claim 6, further comprising:

a receiver, configured to, receive the group ID and the group communication root key from a mobility management entity MME, wherein the group communication root key is generated, according to a random number and a set key corresponding to the group ID, by a home subscriber system HSS to which the MTC device belongs, or the group communication root key is generated according to the random number, the group ID and an exclusive key of one MTC device by the HSS when the HSS receives the group ID from the one MTC device that is forwarded by the MME, and the HSS sends the group communication root key to the MME.

10. The base station according to claim 6, wherein the processor is further configured to:

bind and store the group communication root key, the group key and the group ID;

when it is determined that another MTC device belongs to the group corresponding to the group ID, obtain the bound group key according to the group ID;

wherein the transmitter is further configured to:

send the group key encrypted by using an access stratum key of the another MTC device to the another MTC device, so that the another MTC device obtains the group key through decryption according to the access stratum key of the another MTC device.

* * * * *